(12) United States Patent  (10) Patent No.: US 8,760,690 B2
Ozawa  (45) Date of Patent: Jun. 24, 2014

(54) PRINT SERVER ADAPTED TO IMPLEMENT A PULL-PRINTING TECHNIQUE WITH A PRINTING APPARATUS

(75) Inventor: Shuji Ozawa, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 13/076,355

(22) Filed: Mar. 30, 2011

(65) Prior Publication Data

US 2011/0255128 A1 Oct. 20, 2011

(30) Foreign Application Priority Data

Apr. 16, 2010 (JP) ................................. 2010-095472

(51) Int. Cl.
 *G06F 3/12* (2006.01)
(52) U.S. Cl.
 USPC ........ 358/1.15; 358/1.13; 358/1.14; 709/203; 709/219; 709/217; 707/999.01
(58) Field of Classification Search
 CPC ... G06F 3/1288; G06F 3/1267; G06F 3/1274; H04N 1/00244; H04N 2201/3295
 USPC ............... 358/1.13, 1.14, 1.15; 709/203, 219, 709/217; 707/999.01
 See application file for complete search history.

(56) References Cited

U.S. PATENT DOCUMENTS

| 2005/0114766 A1* | 5/2005 | Yamamoto .................... 715/527 |
| 2009/0021765 A1 | 1/2009 | Takahashi |
| 2009/0033990 A1 | 2/2009 | Matsugashita |
| 2009/0279136 A1* | 11/2009 | Kanno ......................... 358/1.15 |

FOREIGN PATENT DOCUMENTS

| CN | 101339397 A | 1/2009 | |
| EP | 1174789 A2 * | 1/2002 | ............... G06F 3/12 |
| JP | 2002-230430 A | 8/2002 | |
| JP | 2003-167693 A | 6/2003 | |
| JP | 2003167693 A * | 6/2003 | ............... G06F 3/12 |
| JP | 2004-351806 A | 12/2004 | |
| JP | 2005-67003 A | 3/2005 | |

OTHER PUBLICATIONS

Korean Office Action dated Jan. 18, 2013 issued in corresponding Korean Patent Application No. 10-2011-0035040.
Chinese Office Action dated May 29, 2013 issued in corresponding Chinese Patent Application No. 201110097210.3.
European Search Report dated Jun. 18, 2013 issued in corresponding European Patent Application No. 11161262.8.

* cited by examiner

*Primary Examiner* — Jacky X Zheng
(74) *Attorney, Agent, or Firm* — Fitzpatrick, Cella, Harper & Scinto

(57) ABSTRACT

When a printing apparatus completes reception of all print data, a reception unit in the printing apparatus, which receives a cancel notification from a cloud print service, receives the cancel notification by sending a print data status request from the printing apparatus to the cloud print service, or by monitoring a file name of print data which currently undergoes print processing and checking if the file name is changed to a file name indicating a cancel.

11 Claims, 19 Drawing Sheets

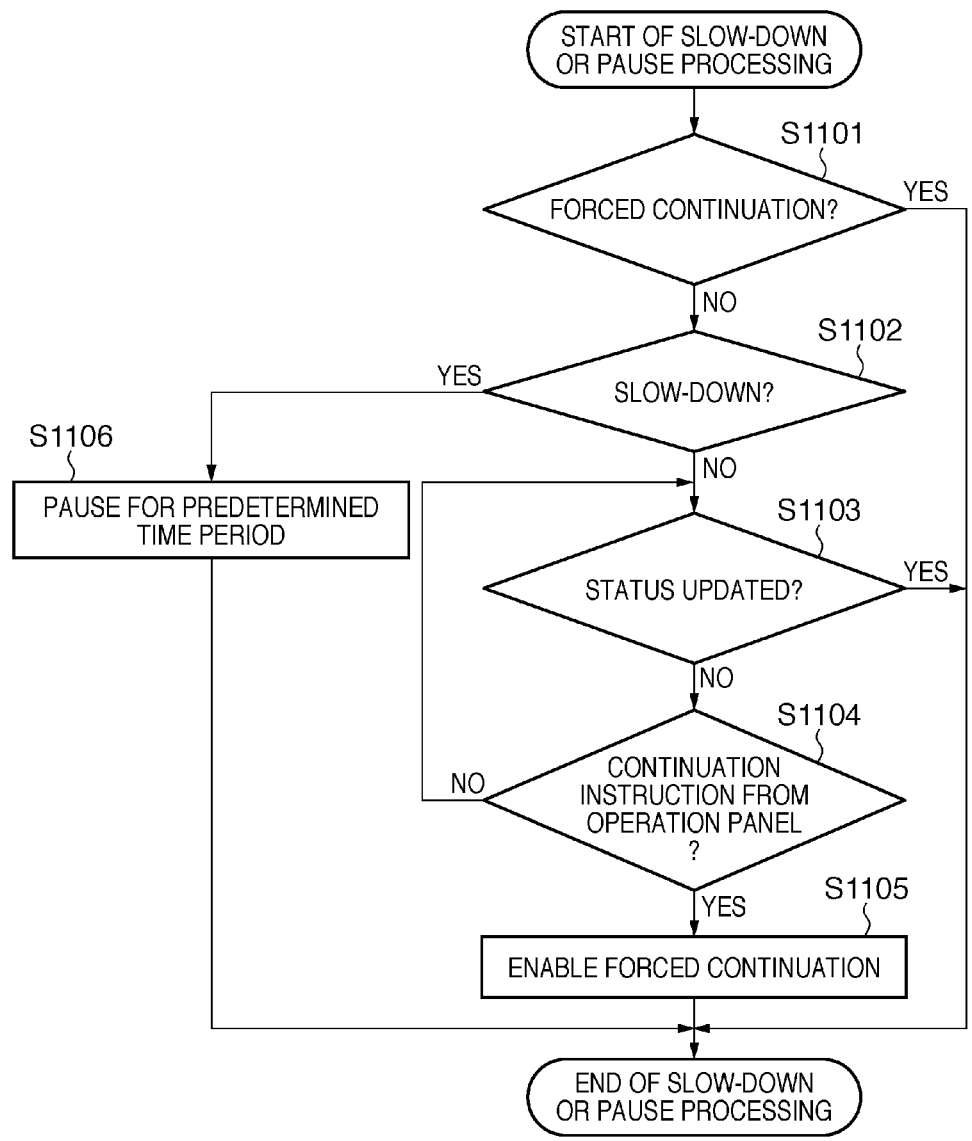

PRINT SERVER ADAPTED TO IMPLEMENT A PULL-PRINTING TECHNIQUE WITH A PRINTING APPARATUS

BACKGROUND OF THE INVENTION

1. Field of the Invention

The present invention relates to a print server and printing apparatus, a network printing system, a printing method and, more particularly, to print processing using a print service such as a cloud print service which is provided from a remote server and also to cancel processing thereof.

2. Description of the Related Art

A system in which a cloud print service generates print data in response to a demand from a user terminal, and a printing apparatus receives and processes the print data and executes print processing is known. The cloud print service and printing apparatus are connected via a public communication network that configures the Internet. For this reason, a firewall is normally set between the network to which the printing apparatus belongs and the Internet, and the printing apparatus and cloud print service communicate with each other via the firewall. The firewall normally allows the printing apparatus to send information to the cloud print service, but does not allow the cloud print service to send information to the printing apparatus except for a response to a request from the printing apparatus. That is, an apparatus on the Internet side cannot normally access, as an initiator, a local network having the firewall. This is to restrict accesses from, for example, unspecified computers on the Internet to the local network.

Owing to this restriction, the cloud print service uses a so-called pull-print method. In the pull-print, a cloud print server (to be simply referred to as a server hereinafter) generates print data, and stores the print data in a specific spool on the cloud print service (that is, on the Internet side viewed from the printing apparatus). The printing apparatus monitors the spool on the cloud print service, and detects that new print data is stored. Monitoring is attained by, for example, periodic polling. When the printing apparatus detects that new print data is stored, it sends a print data request to the spool, and receives the print data as a response to that request, thus executing print processing.

A technique for starting print processing by monitoring print data stored in a spool on a server in this way is disclosed in Japanese Patent Laid-Open No. 2004-351806.

When the firewall exists between the server and printing apparatus, since the server cannot serve as an initiator to transmit information to the printing apparatus, if a cancel operation of the print service is made on a user terminal, the user terminal can notify the server of the cancel. However, the server cannot notify the printing apparatus of any cancel. Also, when the user terminal belongs to a network different from that of the printing apparatus, the user terminal cannot notify the printing apparatus of any cancel. For this reason, even when the server cancels generation of print data and sending of the print data to the spool due to the cancel of the print service, the spooled print data is transferred to the printing apparatus, and the print processing of the already spooled print data is executed although it is canceled.

Japanese Patent Laid-Open No. 2004-351806 also discloses a print service cancel implementation method when the firewall exists between the server and printing apparatus.

As described above, when the firewall exists between the cloud print service and printing apparatus, appropriate cancel processing cannot be executed.

SUMMARY OF THE INVENTION

The present invention has been made in consideration of the aforementioned related arts, and the present invention provides a print server and printing apparatus, a network printing system, and a printing method, which can appropriately execute cancel processing according to a cancel instruction even in a cloud print system, thus eliminating unnecessary print processing and other related processes.

The present invention has the following arrangement.

A print server connected to a network, comprises: a data generation unit, configured to, when a print request input via the network is received, generate print data in accordance with the print request, and storing the print data in a storage; a cancel command generation unit, configured to, when a cancel instruction for the print request is received after the print request is received, cancel generation of the print data according to the print request, and store a cancel command that instructs to cancel the print request in the storage; and a data sending unit, configure to send, in response to a read request of print data received via the network, the print data stored in the storage and the cancel command if the cancel command is stored to an apparatus as a request source of the read request.

According to another aspect, the present invention has the following arrangement.

A printing apparatus, which is connected to a print server that sends print data or a cancel command in response to a read request of print data, the apparatus comprises: a print data acquisition unit, configured to send a read request of print data to the print server, and receive print data sent in response to the read request; a determination unit, configured to determine if the print data acquired by the print data acquisition unit includes a cancel command for processing of the print data; and a processing unit, configured to, when the determination unit determines that the cancel command is not included, execute print processing for the acquired print data, and to, when the determination unit determines that the cancel command is included, cancel print processing for the print data as a cancel command target, and notifying the print server that the print processing is canceled.

According to still another aspect, the present invention has the following arrangement.

A network printing system which connects a print server and a printing apparatus, the printing apparatus comprises: a print data acquisition unit, configured to send a read request of print data to the print server, and receive print data sent in response to the read request; a determination unit, configured to determine if the print data acquired by the print data acquisition unit includes a cancel command for processing of the print data; and a processing unit, configured to, when the determination unit determines that the cancel command is not included, executing print processing for the acquired print data, and for, when the determination unit determines that the cancel command is included, cancel print processing for the print data as a cancel command target, and notify the print server that the print processing is canceled.

According to yet another aspect, the present invention has the following arrangement.

A printing method executed by a network printing system which connects a print server and a printing apparatus via a network, the method comprises: controlling, when the print server receives a print request input via the network, the print server to generate print data according to the print request and to store the print data in storage means; controlling, when the print server receives a cancel instruction for the print request after the print request is received, the print server to cancel generation of the print data according to the print request, and to store a cancel command that instructs to cancel the print request in the storage means; controlling the printing apparatus to send a read request of print data to the print server;

controlling the print server to send, in response to the read request of the print data received via the network, the print data stored in the storage means and the cancel command if the cancel command is stored to an apparatus as a request source of the read request; controlling the printing apparatus to receive the print data sent in response to the read request; controlling the printing apparatus to determine if the print data acquired in the print data acquisition step includes a cancel command for processing of the print data; and controlling, when it is determined that the cancel command is not included, the printing apparatus to execute print processing for the acquired print data, and controlling, when it is determined that the cancel command is included, the printing apparatus to cancel print processing for the print data as a cancel command target, and to notify the print server that the print processing is canceled.

According to the present invention, when a printing apparatus pull-prints print data stored in a print server, even when a firewall exists between the print server and printing apparatus, the printing apparatus executes timely cancel processing in accordance with an instruction, thus providing effects of eliminating unnecessary print processing and an unnecessary charge.

Further features of the present invention will become apparent from the following description of exemplary embodiments (with reference to the attached drawings).

BRIEF DESCRIPTION OF THE DRAWINGS

FIG. 11 is a flowchart showing slow-down or pause processing of the printing apparatus;

DESCRIPTION OF THE EMBODIMENTS

Functional Arrangement of Network Printing System

A network printing system according to an embodiment will be described hereinafter with reference to the drawings.

Figure 1:
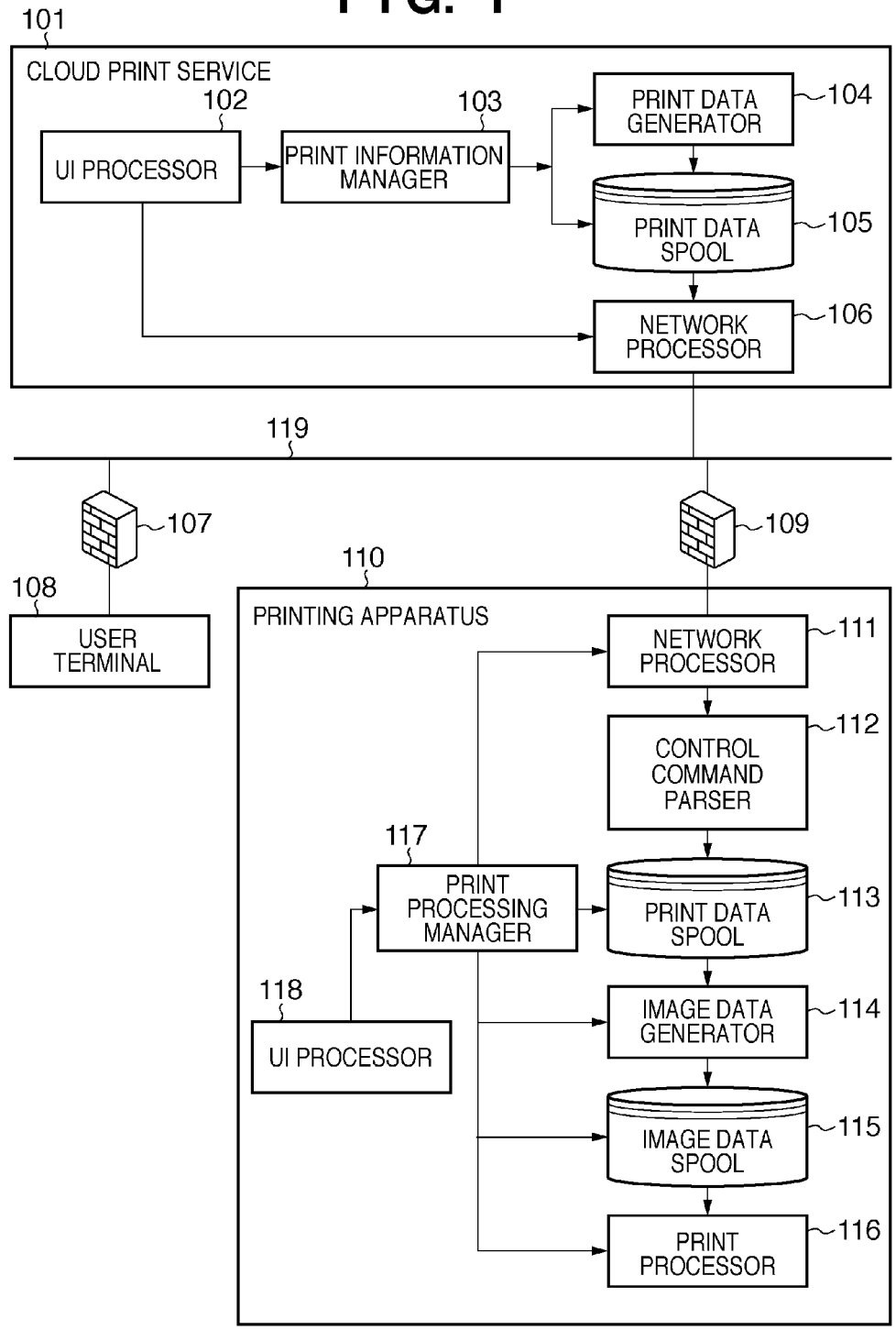
FIG. 1 is a block diagram showing a module arrangement.

FIG. 1 shows the functional module arrangement of the present invention. The user accesses a cloud print service 101 using a user terminal 108 via a public network 119. The cloud print service 101 is configured by either a plurality of servers or a single server. In this embodiment, the cloud print service will also be simply referred to as a print server. A firewall 107 lies between the user terminal 108 and cloud print service 101. The firewall 107 is set to allow the user terminal 108 to access the cloud print service 101 but not to allow the cloud print service 101 to access the user terminal 108. Note that restricted accesses are spontaneous accesses, but the cloud print service can return a response to an access.

When the user accesses the cloud print service 101 from the user terminal 108, a UI screen generation instruction is sent to a UI processor 102 via a network processor 106 included in the cloud print service 101. A UI screen generated by the UI processor 102 in response to the instruction is returned to and displayed on the user terminal 108. The user enters document data to the cloud print service 101 according to the UI screen displayed on the user terminal 108, and inputs a print instruction at a printing apparatus (image forming apparatus) 110. When the user enters the document data on the UI screen, the UI processor 102 sends a print data generation instruction, that is, a print request and the document data to a print information manager 103. The print information manager 103 passes the document data to a print data generator 104, and controls the print data generator 104 to start to convert the document data into print data that can be interpreted by the printing apparatus 110. Such conversion processing will also be simply referred to as data generation of print data. At the same time, the print information manager 103 manages until all pages of the print data are printed by the printing apparatus 110. The print data generator 104 converts the document data received from the print information manager 103 into print data that can be interpreted by the printing apparatus 110, and stores the print data in a print data spool 105 as a storage means.

A firewall 109 exists between the cloud print service 101 and printing apparatus 110 of this embodiment. The firewall 109 is set to allow the printing apparatus 110 to access the cloud print service 101 but not to allow the cloud print service 101 to access the printing apparatus 110. For this reason, the cloud print service 101 cannot spontaneously access the printing apparatus 110 to instruct it to execute print processing. Hence, the printing apparatus 110 periodically refers to the print data spool 105 in the cloud print service 101 or periodically sends an inquiry as to whether or not there is data to be started to be printed to the print information manager 103. Such process will be referred to as a print data monitoring or inquiry process.

More specifically, a print processing manager 117 included in the printing apparatus 110 periodically sends an inquiry about the presence/absence of print data to be printed to the cloud print service 101 via a network processor 111 of the printing apparatus 110. When print data to be printed is present according to that inquiry, the print processing manager 117 instructs the network processor 111 of the printing apparatus 110 to acquire the print data. Note that this instruction may be a response which simply indicates the presence of print data in the printing apparatus 110. In response to this instruction, the network processor 111 of the printing apparatus 110 acquires the print data from the print data spool 105 of the cloud print service 101, and passes the print data to a control command parser 112. In this case, the printing apparatus 110 sends a read request to the cloud print service 101, which sends the print data as a response to the request. That is, the printing apparatus 110 serves as a request source or sender of the read request. The print data includes rendering commands required for actual image formation, and control commands used to instruct to start pages or to cancel print processing, and the control command parser 112 parses control commands as targets. The control command parser 112 interprets the print data. When the print data includes a cancel command (cancel instruction), the control command parser 112 instructs the print processing manager 117 to cancel a print job during processing. Note that to cancel the print job is also to cancel the print request based on which the print job is generated. The print processing manager 117 instructs respective processors included in the printing apparatus 110 to cancel their processes. After the processes executed by all the processors have been canceled in response to this cancel instruction, the print processing manager 117 notifies the cloud print service 101 of the end of the cancel processing. Note that the job undergoing processing is canceled in this case. When an individual print job is canceled, only processes associated with the corresponding print job are canceled.

The control command parser 112 stores the print data including only rendering commands by separating the control commands in a print data spool 113 of the printing apparatus 110. Upon completion of storage of the print data in the print data spool 113, the print processing manager 117 instructs an image data generator 114 to generate image data. The image data generator 114 acquires the print data from the print data spool 113, converts the acquired data into image data, and stores it in an image data spool 115. When the image data generator 114 ends generation of image data for one page, it notifies the print processing manager 117 of that fact. The print processing manager 117 instructs a print processor 116 to execute printout processing onto an actual paper sheet. The print processor 116 acquires the image data from the image data spool 115, and forms an image on an actual paper sheet, thus executing print processing. This process is repeated until the print processing of the image data is complete. When the image data generator 114 has generated image data for all pages included in one print data, it transfers that information to the print processing manager 117 to notify it of the end of the processing. The print processing manager 117 checks if images of all image data stored in the image data spool 115 are formed on paper sheets by the print processor 116. When images of all the image data are formed, the print processing manager 117 notifies the cloud print service 101 of completion of the print processing of the print data. The completion notification of the print processing of the print data sent to the cloud print service 101 is sent to the print information manager 103.

Upon reception of the completion notification of the print processing, the print information manager 103 deletes the print data in the print data spool 105 of the cloud print service 101, and notifies the UI processor 102 that the print processing of the data entered by the user ends. The UI processor 102 generates a UI screen indicating that the print processing of the data entered by the user ends, and sends it to the user terminal 108. The user confirms that the print processing in the printing apparatus 110 ends by viewing the UI screen displayed on the user terminal 108. After the user enters the document data, he or she can cancel the print request by operating a UI screen, which is generated by the UI processor 102 in the cloud print service 101 and is displayed on the terminal 108. Also, the user can cancel the print request by operating a UI screen generated by a UI processor 118 included in the printing apparatus 110.

<Hardware Arrangement>

Figure 2:
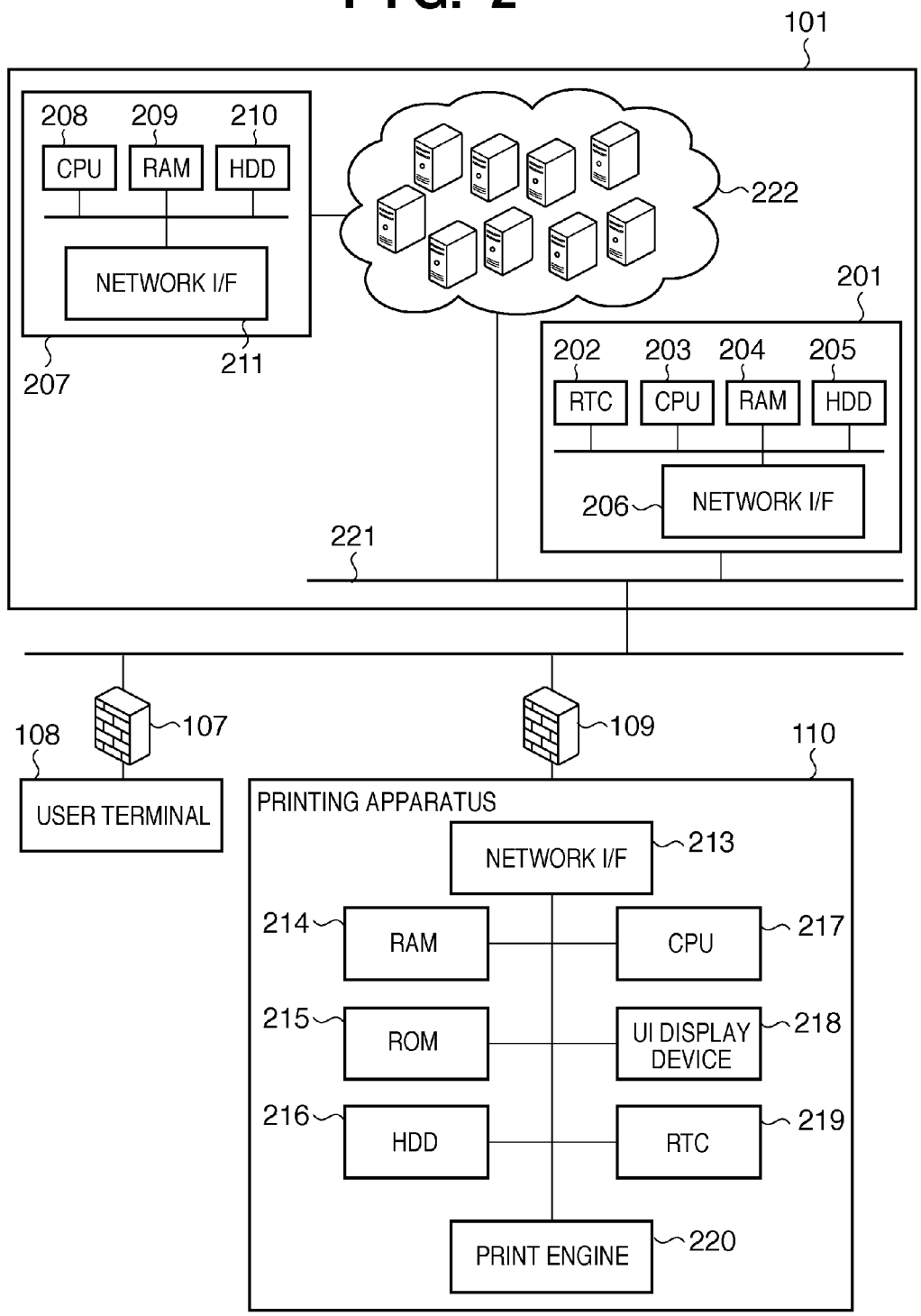
FIG. 2 is a block diagram showing a hardware arrangement.

The hardware arrangements of the cloud print service 101 and printing apparatus 110 of the present invention will be described below with reference to FIG. 2. The cloud print service 101 is configured by a server 201 which serves as an access point from the user terminal 108 and printing apparatus 110, and a server cloud 222 which executes distributed processing of print data generation. The server 201 serving as the access point is connected to the server cloud 222 via a network 221. The UI processor 102 and print information manager 103 shown in FIG. 1 run on the server 201. Programs of the UI processor 102 and print information manager 103 are stored in an HDD 205 on the server 201, are mapped on a RAM 204, and are executed by a CPU 203. When the print information manager 103 wants to detect a time, it acquires time information from an RTC 202 included in the server 201. The network processor 106 of the cloud print service 101 shown in FIG. 1 is included in and runs on the server 201 and all servers of the server cloud 222. A program of each network processor 106 of the cloud print service 101 is mapped from the HDD 205 (HDD 210) onto the RAM 204 (RAM 209), and is executed by the CPU 203 (CPU 208).

The network processors 106 of the cloud print service 101 communicate with the user terminal 108, printing apparatus 110, and respective servers via a network I/F 206 (I/Fs 211). The print data generator 104 runs on each server of the server cloud 222. Each server has a hardware arrangement shown as a server 207. A program of the print data generator 104 is stored in the HDD 210 included in each server 207 of the server cloud 222, is mapped on the RAM 209, and is executed by the CPU 208. Print data generated by the print data generators 104 are temporarily saved in the RAMs 209 or HDDs 210 of the servers 207, respectively. After that, the print data are sent to the RAM 204 or HDD 205 of the server 201, and are combined into one print data.

Programs of the network processor 111, control command parser 112, image data generator 114, print processor 116, print processing manager 117, and UI processor 118 of the printing apparatus 110 shown in FIG. 1 are stored in a ROM 215 or HDD 216 in the printing apparatus 110. These programs are mapped from the ROM 215 or HDD 216 onto a RAM 214 upon power-ON of the printing apparatus 110, and are executed by a CPU 217. The print data spool 113 and image data spool 115 are areas assured on the RAM 214 or HDD 216. The network processor 111 of the printing apparatus 110 communicates with the cloud print service 101 using a network I/F 213 included in the printing apparatus 110. When the print processing manager 117 has to detect a time, it acquires time information from an RTC 219. The UI processor 118 of the printing apparatus 110 displays a UI screen on a UI display device 218, and accepts inputs from the user. The print processor 116 executes image formation on actual paper sheets using a print engine 220.

<Cancel Processing by Cloud Print Service>

The sequence of processing in the cloud print service 101 executed when a cancel instruction is accepted from the user will be described below with reference to FIG. 3. Cancel information (a cancel instruction) sent by the user from the user terminal 108 is received by the network processor 106 via the network I/F 206, and is passed to the UI processor 102. The UI processor 102 passes the cancel information to the print information manager 103 to control it to start cancel processing. The print information manager 103 checks if a print request or print job to be canceled is being executed, that is, if print data is being generated (S301). If print data to be canceled is being generated, the print information manager 103 executes cancel processing during print data generation (to be described later) (S302). Then, the print information manager 103 checks if transfer of print data to the printing apparatus 110 has already been started (S303). If the transfer has been started, the print information manager 103 checks if all print data have already been transferred to the printing apparatus 110 (S304).

If it is determined that the transfer of print data to the printing apparatus 110 has not been started yet, the print information manager 103 deletes the print data in the print data spool 105 (S310). If the transfer of print data to the printing apparatus 110 has already been started, but all print data have not been transferred yet, the print information manager 103 executes cancel processing during data transfer (to be described later) (S305). The print information manager 103 then waits for a cancel processing end notification received from the printing apparatus 110 (S306). The cancel processing end notification which is sent from the printing apparatus 110 to the cloud print service 101 is received by the network processor 106 via the network I/F 207, and is then passed to the print information manager 103. Upon reception of the cancel processing end notification from the printing apparatus 110, the print information manager 103 deletes the print data to be canceled in the print data spool 105 (S310), and notifies the UI processor 102 that the cancel processing ends. The UI processor 102 generates a UI screen indicating that the cancel processing ends, and stores it in the RAM 204 (S311). The user can confirm that the cancel processing has ended by viewing the UI screen which is acquired from the cloud print service 101 and is displayed on the user terminal 108. If all print data have already been transferred to the printing apparatus 110 in step S304, the print information manager 103 executes cancel processing after the end of print data transfer (to be described later) (S307). The print information manager 103 waits for a cancel processing notification from the printing apparatus 110 (S308). Upon reception of the cancel processing notification, the print information manager 103 deletes cancel data (S309). The reason why the cancel data is deleted is that only the cancel processing after end of print data transfer generates the cancel data independently of the print data.

<Print Data File>

Figure 4:
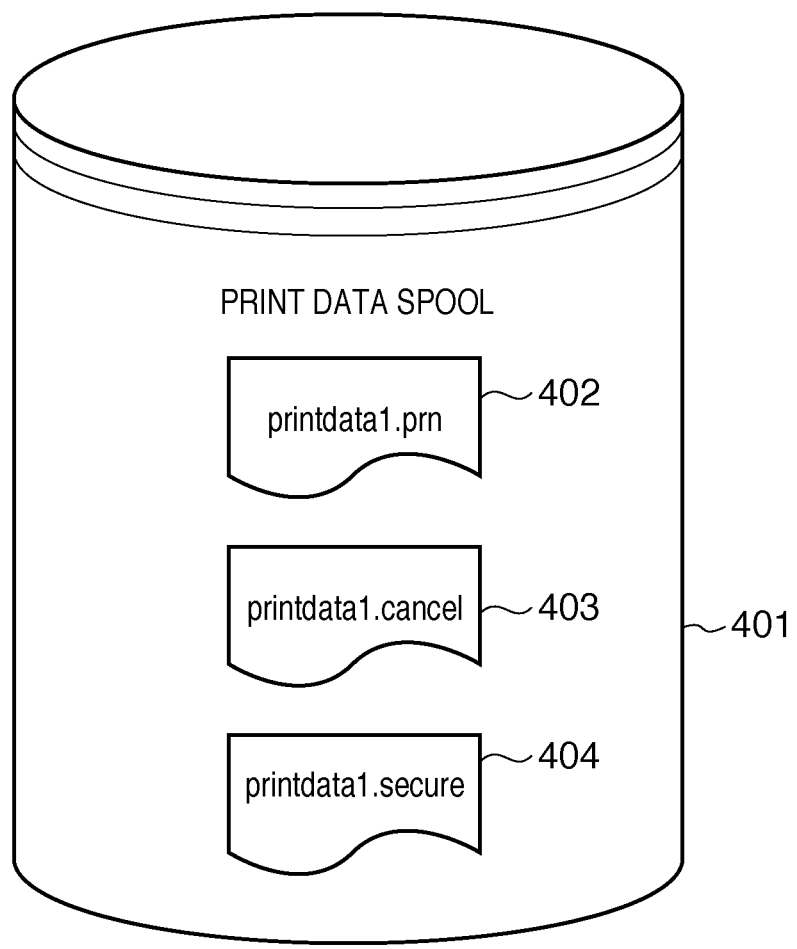
FIG. 4 is a view showing a print data spool of the cloud print service.

Data stored in the print data spool 105 on the cloud print service 101 will be described below with reference to FIG. 4. As shown in FIG. 4, a file 402 having a file name extension ".prn" is used to issue a print instruction to the printing apparatus 110, and is generated by the print data generator 104. A file 403 which is designated with a file name extension ".cancel" is used to issue a cancel instruction to the printing apparatus 110 (cancel file). The cancel file is used when the user inputs a cancel instruction, and there is no notification means (for example, a means for embedding a cancel command in print data) from the cloud print service 101 to the printing apparatus 110. When the printing apparatus 110 periodically monitors the print data spool 105 on the cloud print service 101, it can detect a cancel even after acquisition of all print data is complete. A file 404 having a file name extension ".secure" is a file of print data used to issue a print instruction, but the printing apparatus 110 does not automatically execute print processing if it receives that file. When the user makes a print start operation on the UI display device 218 on the printing apparatus 110, print processing of the print data can be executed.

<Cancel Processing During Print Data Generation (S302)>

Figure 5:
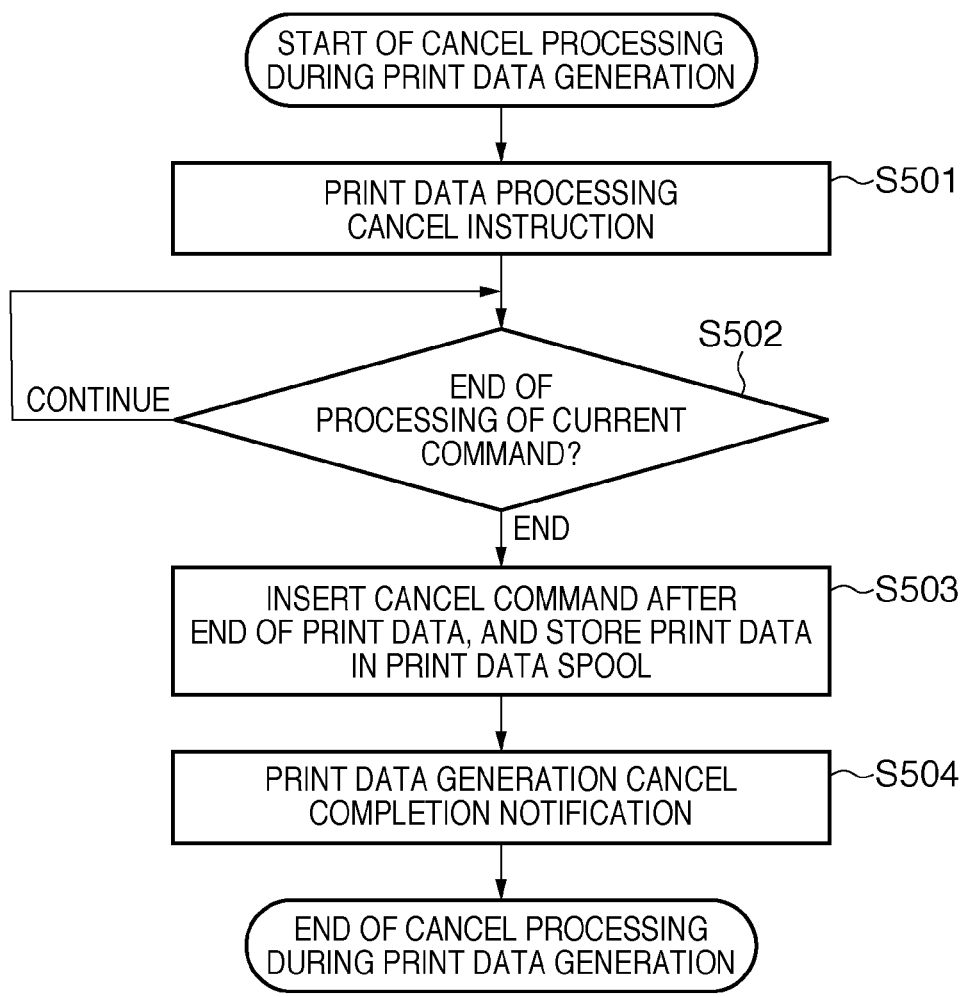
FIG. 5 is a flowchart showing the detailed sequence of cancel processing of the cloud print service.

The sequence of the cancel processing during print data generation in step S302 of FIG. 3 will be described below with reference to FIG. 5. The print information manager 103 which received the cancel instruction instructs the print data generator 104 to cancel print data generation (S501). The print data generator 104 generates print data up to the end of a currently processed command (S502), and then appends a cancel command to the end of the generated print data (S503). Since the print data generator 104 runs on an arbitrary server of the server cloud 222, the print data embedded with the cancel command is temporarily stored in the RAM 209 or HDD 210. After that, the print data generator 104 stores that print data in the RAM 204 or HDD 205 on the server 201 via the network 221. The print data generator 104 then notifies the print information manager 103 that the cancel processing in the cloud print service 101 ends (S504). The print information manager 103 runs on the server 201, and the print data generator 104 runs on an arbitrary server of the server cloud 222. For this reason, the print information manager 103 and print data generator 104 exchange instructions via the network 221 during this period. In this manner, the cancel command embedded in the print data is interpreted and executed by the printing apparatus 110 to attain cancel processing in the printing apparatus 110. In response to completion of this cancel processing, a cancel end notification is sent to the cloud print service 101. Since a next command to be generated is replaced by the cancel command, unnecessary sending processing and other related processes can be eliminated as much as possible.

<Cancel Processing During Print Data Transfer (S305)>

Figure 6:
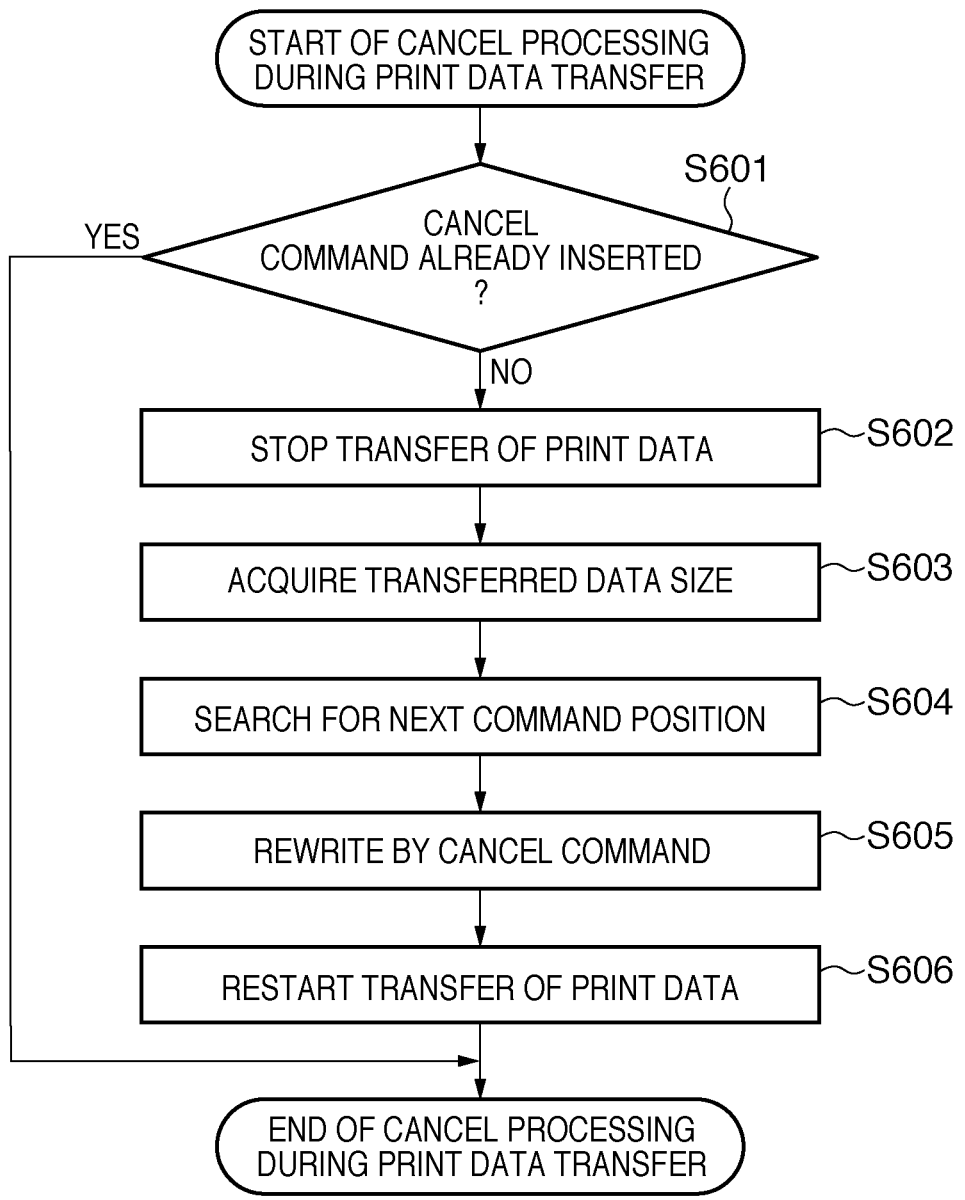
FIG. 6 is a flowchart showing the detailed sequence of cancel processing of the cloud print service.

The sequence of the cancel processing during print data transfer in step S305 of FIG. 3 will be described below with reference to FIG. 6. If the cancel processing during print data generation (S302) has already been executed, the print information manager 103 judges that this sequence ends without any processing (S601). Otherwise, the print information manager 103 instructs the network processor 106 to stop sending of print data to the printing apparatus 110 (S602). The print information manager 103 instructs the network processor 106 to acquire the transferred print data size (S603). The print information manager 103 acquires the print data stored in the print data spool 105 of the cloud print service 101. Then, the print information manager 103 specifies a first command of the print data to be sent, that is, a next command to be transferred to the printing apparatus 110 based on the transferred data size acquired in step S603 (S604). The print information manager 103 rewrites the specified command by a cancel command, and overwrites the print data on the print data spool 105 of the cloud print service 101 (S605). The print information manager 103 instructs the network processor 106 to restart sending of the print data to the printing apparatus 110. In this way, the cancel command embedded in the print data is interpreted and executed by the printing apparatus 110 to attain cancel processing in the printing apparatus 110. In response to completion of this cancel processing, a cancel end notification is sent to the cloud print service 101. Since the next command to be sent is replaced by the cancel command, unnecessary sending processing and other related processes can be reduced as much as possible.

Figure 7:
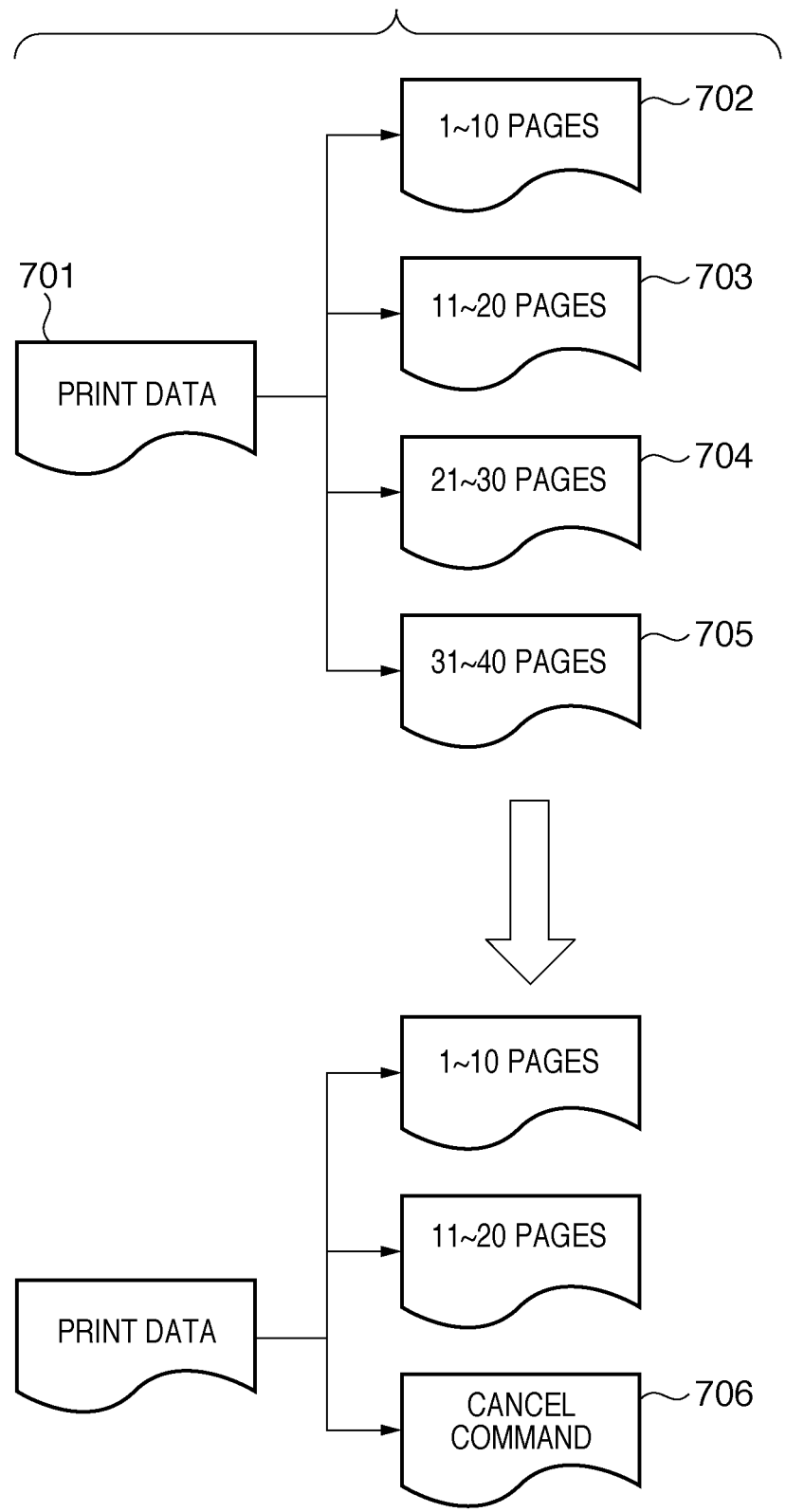
FIG. 7 is a view showing the print data spool format.

In this case, the network processor 106 may often not stop sending to the printing apparatus 110, or when sending is stopped, the printing apparatus 110 side may reach a time-out and print processing may result in a failure. Hence, when the print data is configured by a plurality of data files, as shown in FIG. 7, a cancel command can be inserted without stopping the processing of the network processor 106. A file 701 describes link information of partial data 702, 703, 704, and 705 of print data divided for the predetermined number of pages. The printing apparatus 110 sequentially acquires print data based on the link information described in the file 701. The print information manager 103 prepares for print data including only a cancel command. If print data currently sent to the printing apparatus 110 is that included in, for example, the partial data 703, the print information manager 103 replaces print data of the partial data 704 by print data 706 including only a cancel command. As a result, sending is never interrupted. However, in this case, every time reception of partial data is complete, the printing apparatus 110 has to send a next print data request to the cloud print service 101.

When partial data which is being sent is that which configures the last part of the print data, there is no next partial data to be sent. Hence, in this case, it is determined in step S304 that print data transfer is complete.

<Cancel Processing after End of Print Data Transfer (S307)>

Figure 3:
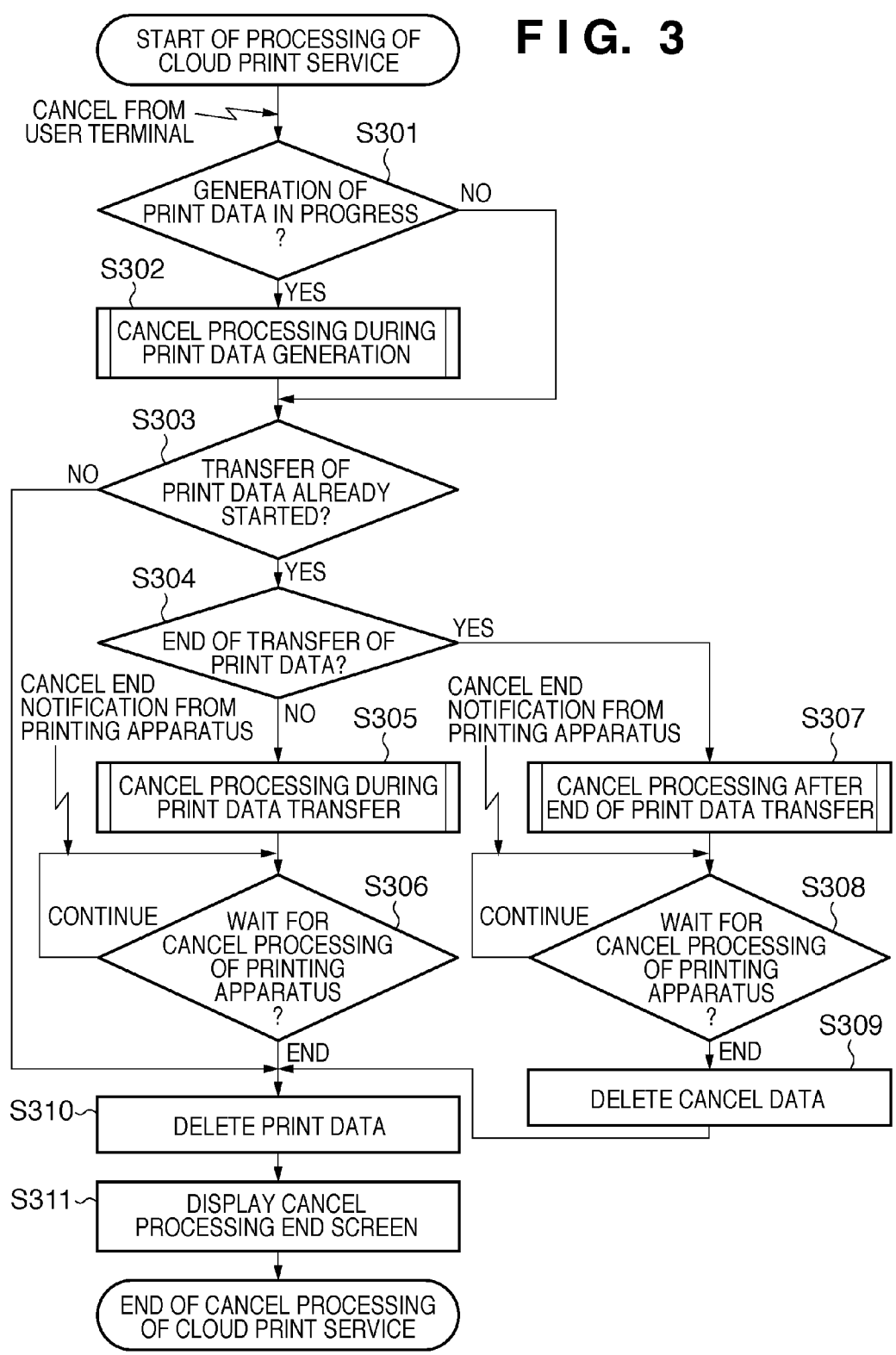
FIG. 3 is a flowchart showing the overall sequence of a cloud print service.
Figure 8:
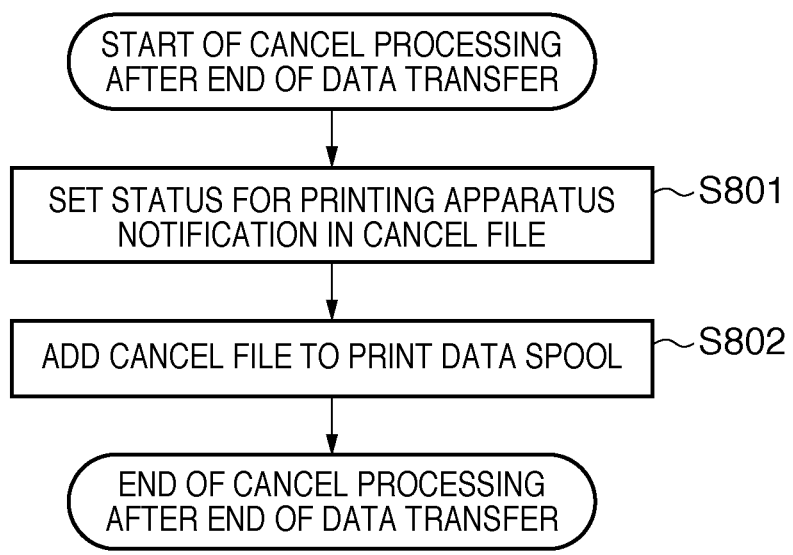
FIG. 8 is a flowchart showing the detailed sequence of cancel processing of the cloud print service.

FIG. 8 shows the cancel processing after the end of print data transfer in step S307 of FIG. 3. In this case, the cloud print service 101 cannot send a cancel notification to the printing apparatus 110 by embedding a cancel command in print data. For this reason, the print information manager 103 prepares to notify a cancel state from the user upon reception of a status inquiry of print data from the printing apparatus 110 (S801). Furthermore, the print information manager 103 stores the file 403 indicating a cancel in the print data spool 105 of the cloud print service 101. The printing apparatus 110 detects a cancel by acquiring the status of print data from the print information manager 103 or by acquiring a file name which is stored in the print data spool 105 in the cloud print service 101 and indicates a cancel. In this way, when sending of print data is complete, a cancel command indicating a cancel instruction is stored as data independent from print data. In other words, a cancel command is written as the content of a next data file to be sent, and is stored in, for example, the print data spool.

<Print Data Reception and Cancel Instruction Monitoring Operation by Printing Apparatus>

Figure 9A:
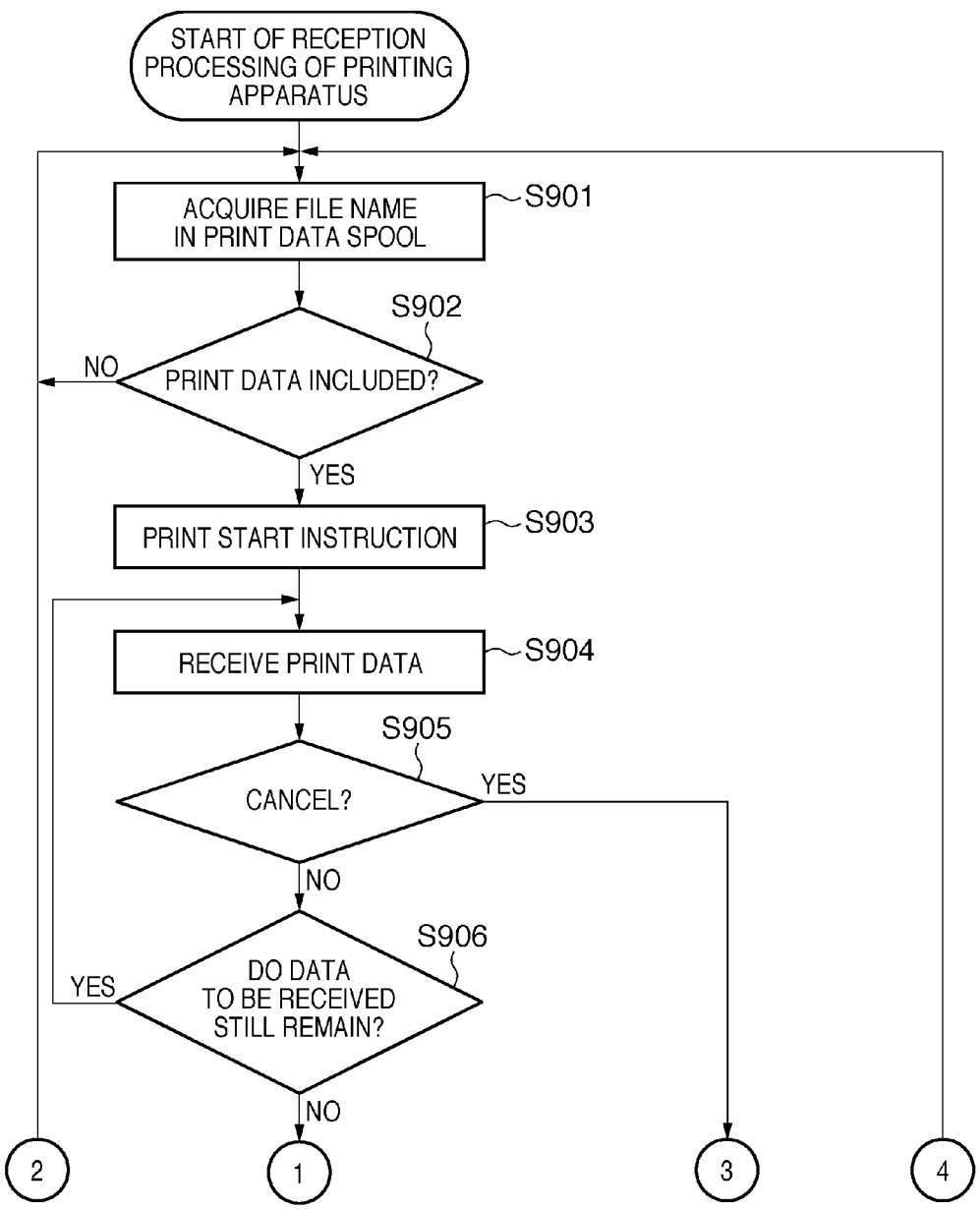
FIGS. 9A and 9B are flowcharts showing reception processing of a printing apparatus.
Figure 9B:
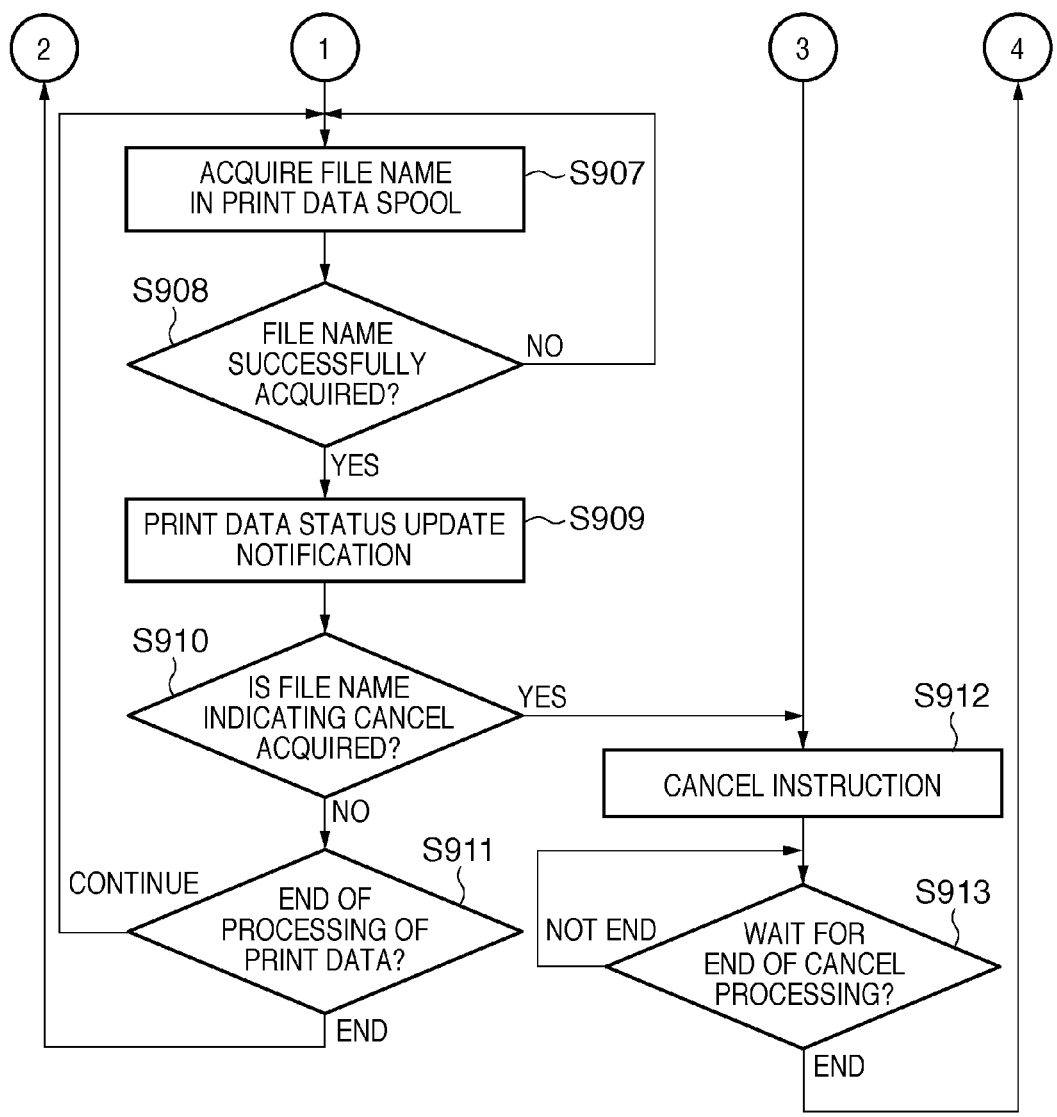

The operations of the network processor 111 and control command parser 112 in the printing apparatus 110 will be described below with reference to FIGS. 9A and 9B. The network processor 111 of the printing apparatus 110 begins to monitor the print data spool 105 of the cloud print service 101 after power-ON, and monitors whether or not a print data file to be printed by the printing apparatus is stored (S901). This monitoring process can be implemented by polling. In this case, the printing apparatus 110 periodically sends an inquiry about the presence/absence of new print data to be printed by itself to the cloud print service 101. The cloud print service 101 returns information indicating the presence/absence of the corresponding print data in response to that inquiry. Alternatively, the cloud print service 101 may return information (including information indicating a printing apparatus used to execute print processing) associated with print data stored in the print data spool 105. In this case, the printing apparatus which received the information interprets the information, and checks if the information includes print data to be printed by that printing apparatus.

Upon reception of the response from the cloud print service 101, if there is print data to be printed, the network processor 111 of the printing apparatus 110 sends a print start notification to the print processing manager 117 of the printing apparatus 110. The network processor 111 of the printing apparatus 110 sends a read request of the corresponding print data to the cloud print service 101, and receives the print data as a response. The received print data are sequentially passed to the control command parser 112 (S904).

The control command parser 112 interprets the print data to check if a cancel command is included (S905). If no cancel command is included, the control command parser 112 stores the print data in the print data spool 113 of the printing apparatus 110. If the control command parser 112 detects a cancel command, it issues a cancel instruction to the print processing manager 117 (S912). The network processor 111 and control command parser 112 in the printing apparatus 110 wait until a cancel processing end notification is received from the print processing manager 117 (S913). Upon reception of the cancel processing end notification, the control returns to monitoring of print data again.

On the other hand, if no cancel command is included, the network processor 111 of the printing apparatus 110 checks if all print data have been received (S906). If print data to be received still remain, for example, if print data is divided into partial data, as shown in FIG. 7, the network processor 111 sends a read request for each partial data, and repeats reception until reception of print data associated with one print job is completed.

Next, the network processor 111 of the printing apparatus 110 sends a request of file names stored in the print data spool 105 to the cloud print service 101, and receives the file names as a response (S907, S908). After the file names can be successfully acquired, the network processor 111 of the printing apparatus 110 notifies the print processing manager 117 of a print data status update instruction (S909). The print processing manager 117 acquires a current time from the RTC 219, and records it as a print data status update time. The print data status indicates at least a successful communication with the cloud print service 101 and that time. The network processor 111 checks if the file names acquired in step S907 includes a file having a file name extension ".cancel" (S910). If such a file is included, the network processor 111 of the printing apparatus 110 checks if a part obtained by excluding the file name extension from that file name matches the file name (except for a file name extension) of the currently processed print data (S910). If the file names match, the network processor 111 instructs the print processing manager 117 to cancel the processing of that print data (S912).

The network processor 111 checks in step S911 if the processing of the print data is currently in progress. If the processing is in progress, the network processor 111 repeats the processes from step S907 so as to monitor a cancel instruction to the processing of the print data. On the other hand, if the processing of the print data is complete, the network processor 111 monitors the print data spool 105 of the cloud print service 101 again (S911).

When a print data status can be acquired from the print information manager 103 of the cloud print service 101, the status may be requested and acquired in place of the file names in step S907. In this embodiment, after the printing apparatus 110 acquires all print data, cancel instruction monitoring is started for the cloud print service 101, but it may be started at the beginning of acquisition of print data. In this case, a cancel instruction may be detected before the printing apparatus 110 processes a cancel command included in print data. For this reason, when a data amount to be printed is large, unnecessary print processing can be avoided.

<Print Operation by Printing Apparatus>

Figure 10A:
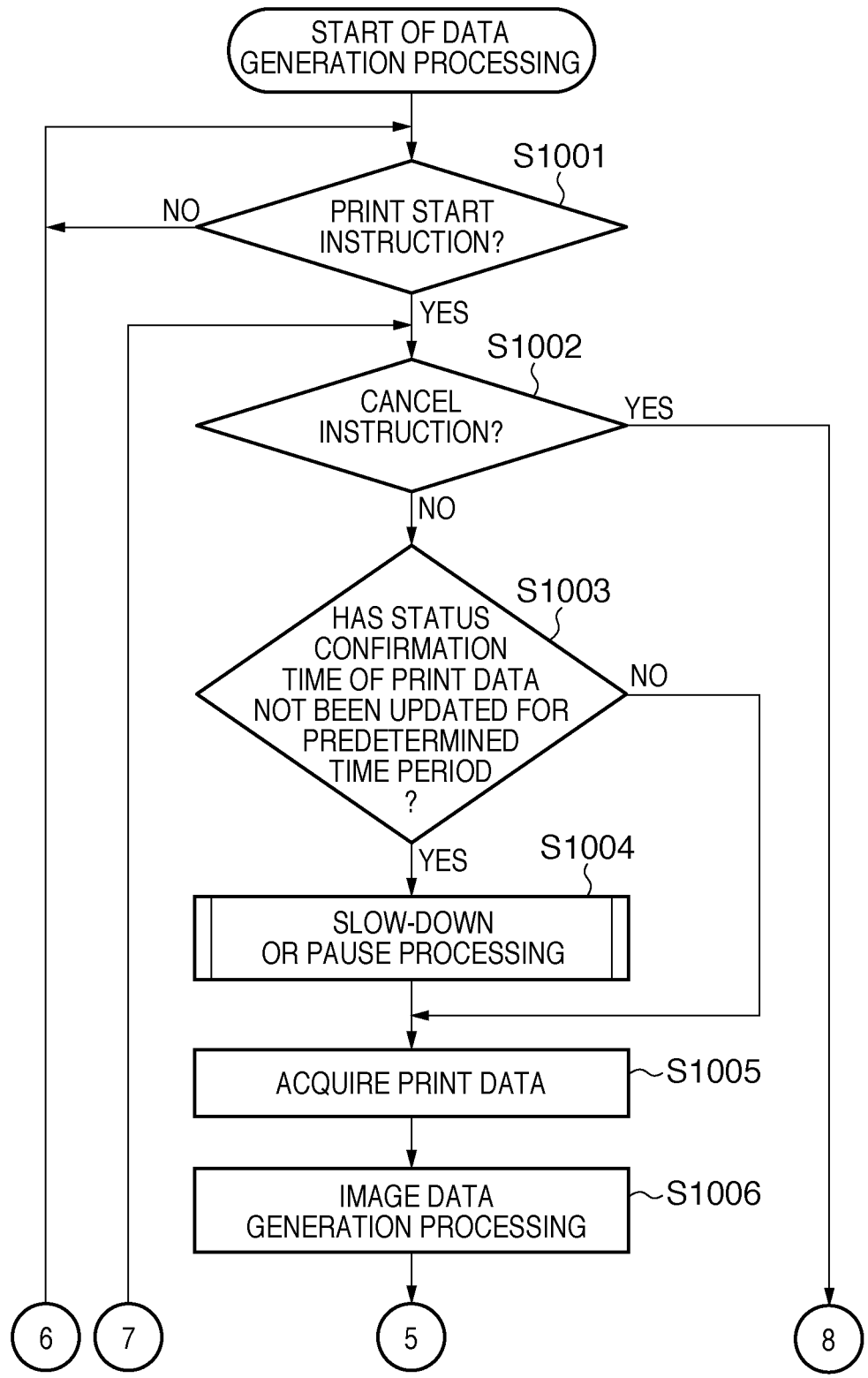
FIGS. 10A and 10B are flowcharts showing print processing of the printing apparatus.
Figure 10B:
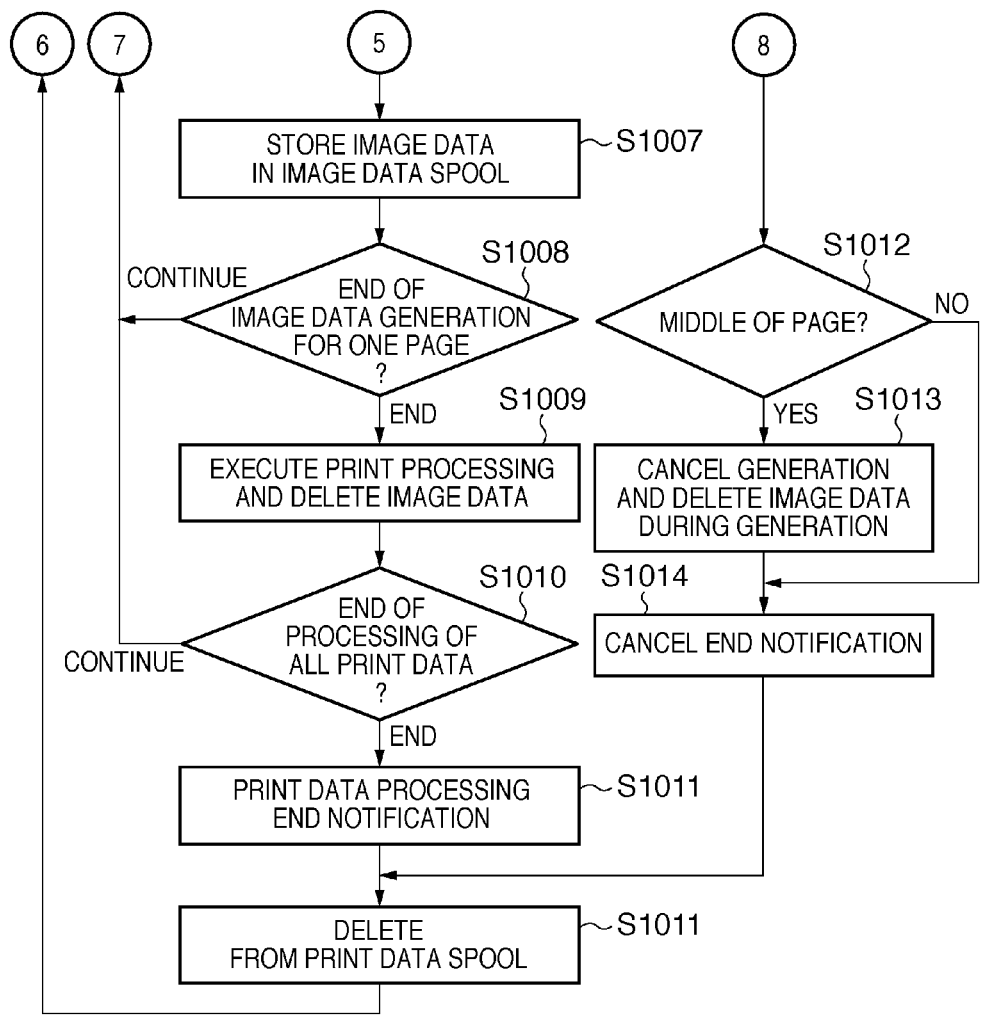

The operations of the print processing manager 117 and image data generator 114 of the printing apparatus 110 will be described below with reference to FIGS. 10A and 10B. The print processing manager 117 waits for a print start instruction from the network processor 111 (S1001), and starts print processing in response to the print start instruction from the network processor 111 in step S903. The print processing manager 117 checks if the cancel instruction issued in step S912 is received (S1002). If the network processor 111 issues the cancel instruction to the print processing manager 117, the print processing manager 117 cancels continued generation processing of image data. For this purpose, the print processing manager 117 checks if image data is generated up to the middle of a page (S1012). If a page is partially generated, the print processing manager 117 issues a processing cancel instruction to the image data generator 114. After the print processing manager 117 confirms that the image data generator 114 cancels its processing, it deletes the partially generated image data from the image data spool 115 (S1013). After that, the print processing manager 117 notifies the network processor 111 and control command parser 112 that the cancel processing has ended, and sends a cancel end notification to the cloud print service 101 via the network processor 111 (S1014).

On the other hand, if it is determined in step S1002 that no cancel instruction is received, the print processing manager 117 checks if a print data status has not been updated for a predetermined time period (S1003). If a print data status has not been updated for the predetermined time period, that is, if the predetermined time period or more has elapsed since the last update time, a communication failure may have occurred. Hence, the print processing manager 117 executes slow-down or pause processing (to be described later) (S1004). If the predetermined time period has not elapsed yet since the last update time, since the slow-down or pause processing is not required, the print processing manager 117 instructs the image data generator 114 to acquire print data. In response to this instruction, the image data generator 114 acquires print data from the print data spool 113 (S1005). In this case, the data size of print data acquired by the image data generator 114 is fixed, and the image data generator 114 does not acquire all print data or full data for one page. The image data generator 114 converts the acquired print data into image data (S1006), and stores it in the image data spool 115 (S1007). If generation of image data for one page is not complete yet, the image data generator 114 notifies the print processing manager 117 of that fact, and executes the processes in steps S1002 to S1007 again (S1008).

Upon completion of generation of image data for one page, the image data generator 114 notifies the print processing manager 117 of completion of image data generation for one page. After an image is formed on a paper sheet, the printed image data is deleted (S1009). Image formation on a paper sheet is started when the print processing manager 117 notifies the print processor 116 of a print instruction. The print processor 116 acquires image data from the image data spool 115, and forms an image on a paper sheet using the print engine 220. The print processor 116 notifies the print processing manager 117 of end of image formation on a paper sheet. The print processing manager 117 repeats the processes in steps S1002 to S1009 until print processing of all pages included in the print data is completed (S1010). Upon completion of the print processing of all pages included in the print data, the print processing manager 117 notifies the cloud print service 101 of completion of the print processing of the print data via the network processor 111 (S1011), and deletes the print data from the print data spool 113 (S1012).

<Slow-Down or Pause Processing>

The slow-down or pause processing which is executed by the print processing manager 117 in step S1004 in FIGS. 10A and 10B in case of a long-term communication failure between the cloud print service 101 and printing apparatus 110 will be described below with reference to FIG. 11. When a long-term communication failure has occurred between the cloud print service 101 and printing apparatus 110, information indicating that a print request was canceled (a cancel instruction) cannot be acquired. For this reason, after the user issues a cancel instruction to the cloud print service 101, many pages are undesirably printed. When the user pays a charge depending on the number of printed pages by contract, such a situation generates an unnecessary charge. The processing shown in FIG. 11 is a means for reducing an unnecessary charge for the user.

The print processing manager 117 checks if the user has already input a print continuation instruction (forced continuation) from the UI display device 218. If the print continuation instruction has already been input, the print processing manager 117 continues print processing (S1101). If a time difference between the last update time of the print data status and the current time is relatively short, the print processing manager 117 determines to slow down the processing (S1102), suspends the processing, and restarts the print processing after an elapse of a predetermined time period (S1106). Whether or not the time difference is "relatively short" is judged by comparing it with a predetermined threshold. If it is determined not to slow down the processing in step S1102, that is, if the time difference between the last update time of the print data status and the current time is long, the print processing manager 117 pauses the processing until that status is updated (S1103). However, when the user inputs a print continuation instruction from an operation panel of the UI display device 218, the print processing manager 117 restarts the print processing if the print data status is not updated (S1104). When the user inputs a print continuation instruction from the UI display device 218, the print processing manager 117 determines that the print processing of the print data during processing is forcibly continued, and continues the print processing if the print data status is not updated after that (S1105). As described above, when a communication failure may have occurred, there is a difference between a time at which the user issues a cancel instruction to the cloud print service 101 and that at which the printing apparatus actually executes cancel processing. Hence, the sequence of FIG. 11 pauses the print processing if a communication failure may have occurred. Even when a cancel instruction is input, the progress of the print processing during a period after the failure is recovered until the cancel instruction is acquired can be delayed.

<Charge Reduction Processing>

Figure 12A:
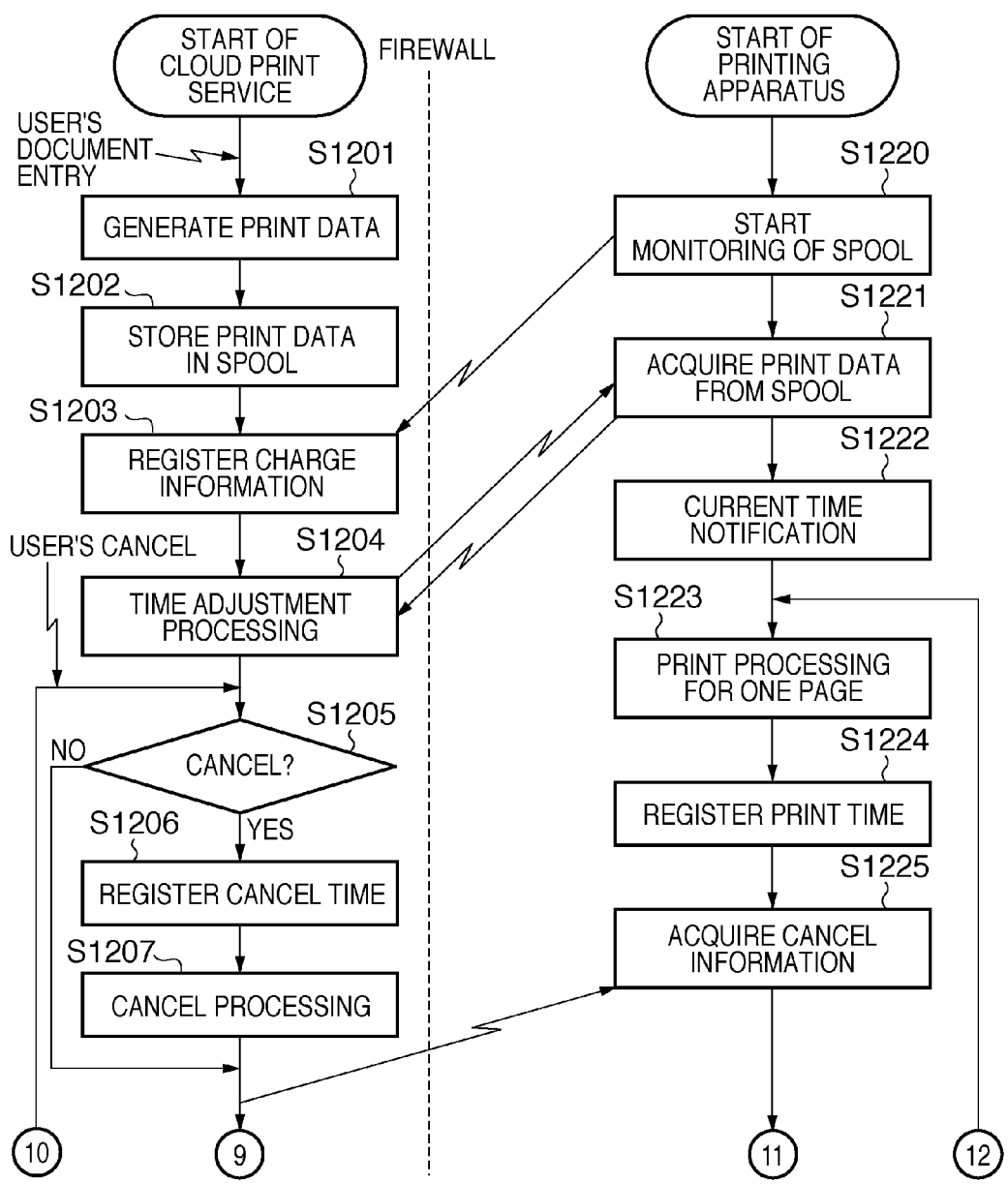
FIGS. 12A and 12B are flowcharts showing the overall sequence of charge information update processing at the time of a cancel.
Figure 12B:
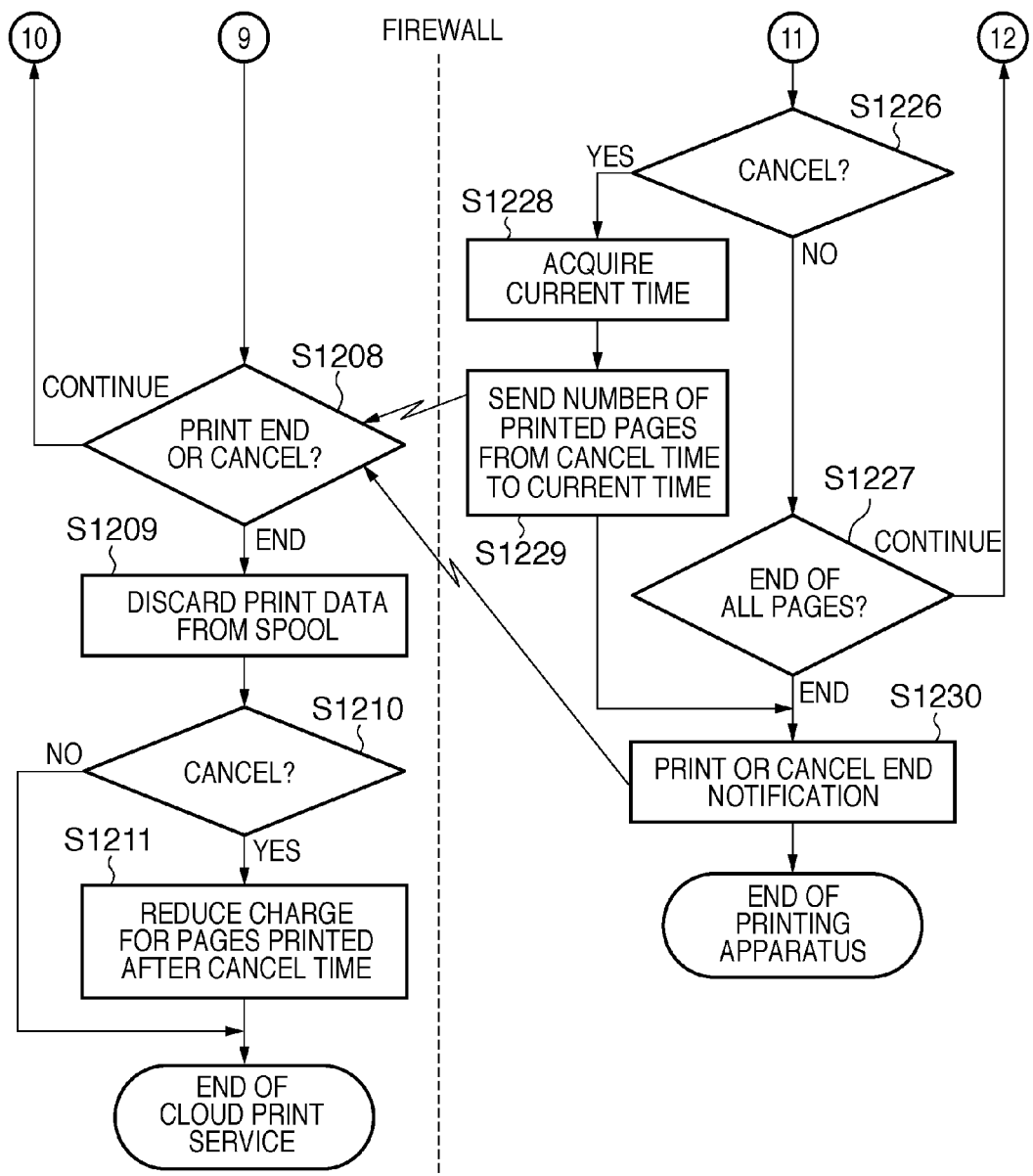

The method of reducing the number of pages printed during that time period has been described using FIG. 11. A method of reducing or deducting a charge in association with the number of pages printed during that time period will be described below using FIGS. 12A and 12B. The user enters document data to the cloud print service 101. Then, the print data generator 104 generates print data (S1201), and stores the print data in the print data spool 105 (S1202). The print data generator 104 notifies the print information manager 103 of the number of pages included in the print data (or a print data amount), and the print information manager 103 saves the number of pages in charge information (S1203).

After power-ON, the printing apparatus 110 begins to monitor the print data spool 105 of the cloud print service 101 (S1220). Since the print data is stored in the print data spool 105 of the cloud print service 101 in step S1203, the printing apparatus 110 begins to acquire the print data (S1221). At the same time, the print processing manager 117 of the printing apparatus 110 acquires the current time from the RTC 224 and notifies the cloud print service 101 of the current time (S1222). The print processing manager 117 of the printing apparatus 110 acquires a print time from the RTC 224 every time it prints one page (S1223), and saves the acquired time in the RAM 219 (S1224).

When the printing apparatus 110 notifies the cloud print service 101 of the current time of the printing apparatus 110 in step S1222, the print information manager 103 reads the current time from the RTC 202 of the cloud print service 101, and stores a time difference between them (S1204). After that, time information is passed to the printing apparatus after it is adjusted to the time of the printing apparatus based on the stored time difference. That is, the process in step S1204 is done to adjust times.

The cloud print service 101 checks a cancel instruction input (S1205). If a cancel instruction from the user is accepted, the print information manager 103 stores a time at that timing, that is, a cancel time (S1206). The cancel time is stored in association with a cancel command. The registered cancel time is adjusted to the time of the printing apparatus 110 by adding the time difference saved in step S1204 to a time read from the RTC. After that, the cloud print service 101 executes the cancel processing according to the progress of the processing of the print data (S1207), and waits for a print or cancel end notification from the printing apparatus 110 (S1208).

When the printing apparatus 110 detects a cancel command (S1225, S1226), the print processing manager 117 acquires the cancel time saved in step S1207 from the cloud print service 101 (S1228). If the print times of the respective pages recorded in step S1224 include those after the cancel time acquired in step S1228, the print processing manager 117 notifies the cloud print service 101 of the corresponding number of pages (S1229). That is, the print processing manager 117 notifies the cloud print service 101 of the number of pages printed after the cancel time. Note that in this example, since information as a basis of a charge to be counted by the printing apparatus is the number of pages, the number of pages is counted. However, when pieces of information as a basis of a charge include those (for example, the size-, color-, and double-sided-dependent numbers of pages) which cannot be managed by the cloud print service but can be managed by the printing apparatus, those pieces of information are sent in place of or in addition to the number of pages. Such information will be simply referred to as a data amount or charge adjustment information hereinafter.

The number of pages received from the printing apparatus 110 in step S1229 is passed to the print information manager 103 of the cloud print service 101, and is saved by the print information manager 103. When the printing apparatus 110 ends the processing of all pages included in the print data or the cancel processing, it sends a print or cancel end notification to the cloud print service 101 (S1230). Upon reception of the print or cancel end notification from the printing apparatus 110 (S1208), the print information manager 103 deletes the print data from the print data spool 105 (S1210). After that, the print information manager 103 checks if the cancel has occurred (S1211). If the cancel has occurred, the print information manager 103 makes a charge calculation based on the number of pages received from the printing apparatus 110 in step S1229 and that printed in the print job, thus changing the charge information. For example, the print information manager 103 executes processing for marking down a charge for the number of pages printed after the cancel to half or invalidating that charge.

<Charge Information Recovery Processing>

Figure 13:
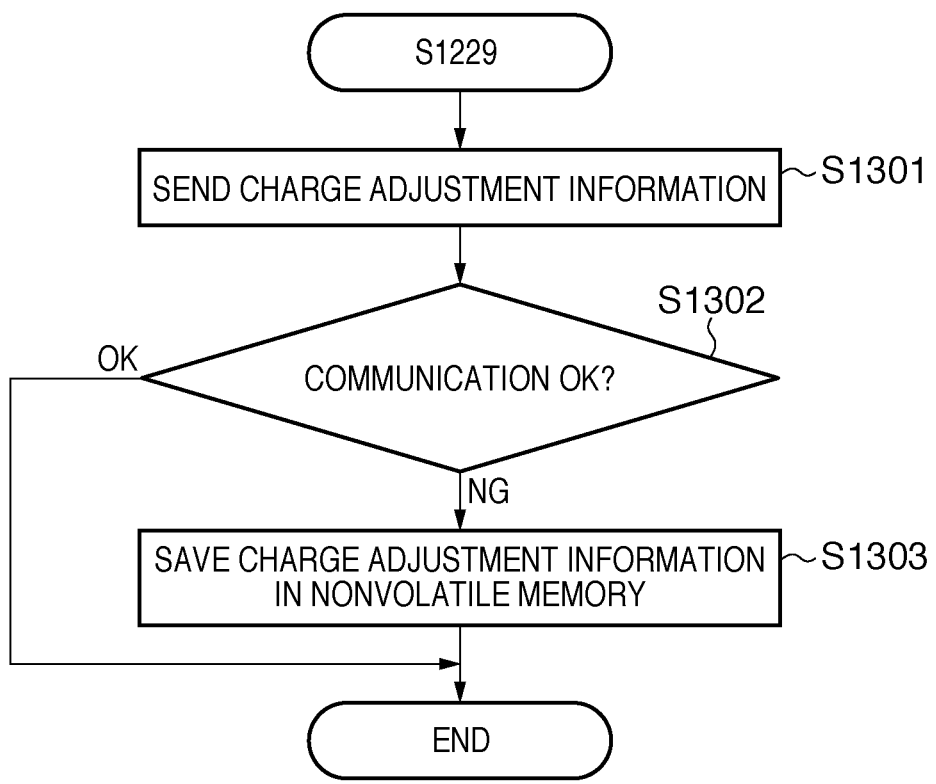
FIG. 13 is a flowchart showing the detailed sequence of charge information update processing at the time of a cancel (power OFF)
Figure 14:
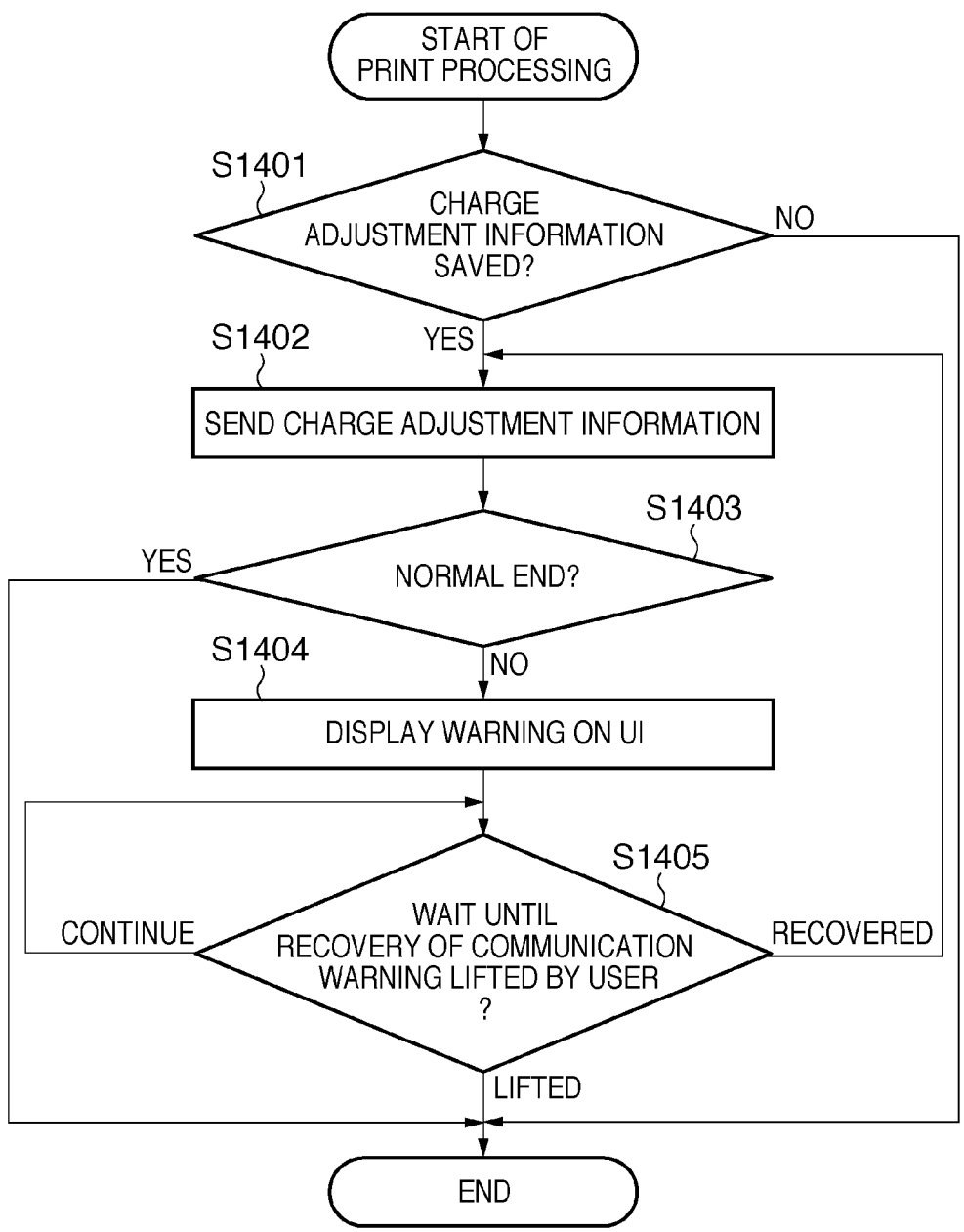
FIG. 14 is a flowchart showing the detailed sequence of charge information update processing at the time of a cancel (power ON)

FIGS. 13 and 14 show a recovery means when the power supply of the printing apparatus (multi-function peripheral (MFP) in this case) 110 is turned off, and the printing apparatus 110 cannot notify the cloud print service 101 of information of the number of printed pages in step S1229. For example, the power supply of the printing apparatus may be turned off for the purpose of recovery when a communication failure has occurred between the cloud print service 101 and printing apparatus 110.

FIG. 13 shows details of step S1229. The print processing manager 117 of the printing apparatus 110 attempts to send charge adjustment information (information sent in step S1229 of FIG. 12B) to the cloud print service 101 (S1301). However, if the sending process is not normally terminated (NG in step S1302), the print processing manager 117 saves the charge adjustment information in a nonvolatile memory (ROM 220 or HDD 221 shown in FIG. 2) (S1303). After that, power-OFF processing is executed.

At the next power-ON timing (or at the recovery timing of a communication), the print processing manager 117 of the printing apparatus 110 checks if the charge adjustment information is saved in the nonvolatile memory (S1401). If the charge adjustment information is saved, the print processing manager 117 sends it to the cloud print service 101. If the sending process is normally terminated, the sent charge adjustment information is deleted. On the other hand, if the print processing manager 117 of the printing apparatus 110 cannot normally send the charge adjustment information to the cloud print service 101 (NO in step S1403), it displays a warning on the UI display device (S1404), and waits until a communication is recovered or the user lifts the warning on the UI display device 228 (S1405).

After the warning is lifted, the processing ends. If a communication is recovered, an attempt to re-send the charge adjustment information is made in step S1402. The cloud print service 101 generates charge information by reflecting, to a charge for the user, the charge adjustment information such as the number of pages printed after the cancel, which information is acquired in this step.

Note that when a communication failure between the printing apparatus 110 and cloud print service 101 has not been recovered for a long period of time, the user can acquire the charge adjustment information from the printing apparatus 110 and can notify the cloud print service 101 of that information from the user terminal 108. As a method of acquiring the charge adjustment information from the printing apparatus 110 by the user, the user terminal 108 accesses the printing apparatus 110 via the network or the user attaches a storage medium such as a flash ROM to the printing apparatus 110, so as to acquire that information as a charge adjustment information file. The user terminal 108 notifies the cloud print service 101 of the acquired charge adjustment information file by operations on UI screens shown in FIGS. 15A, 15B, 15C, and 15D.

Figure 15A:
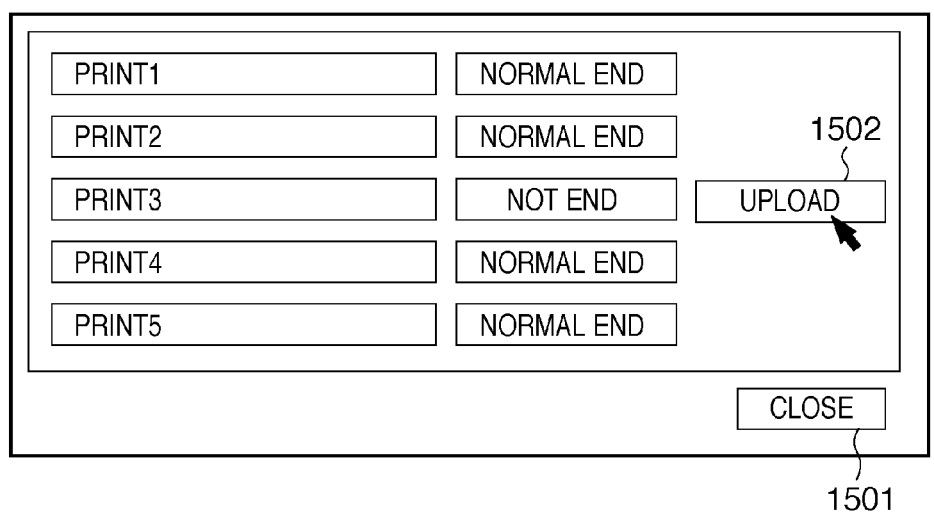
FIGS. 15A to 15D are views showing upload UI screens of cancel information from a user terminal.
Figure 15B:
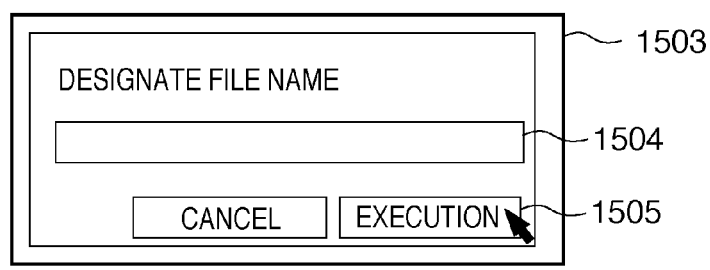
Figure 15C:
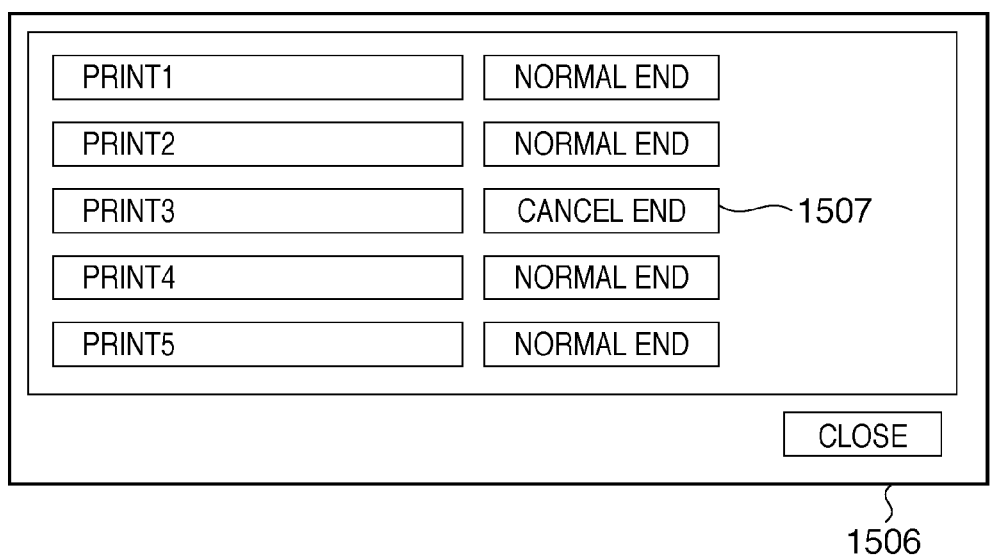
Figure 15D:
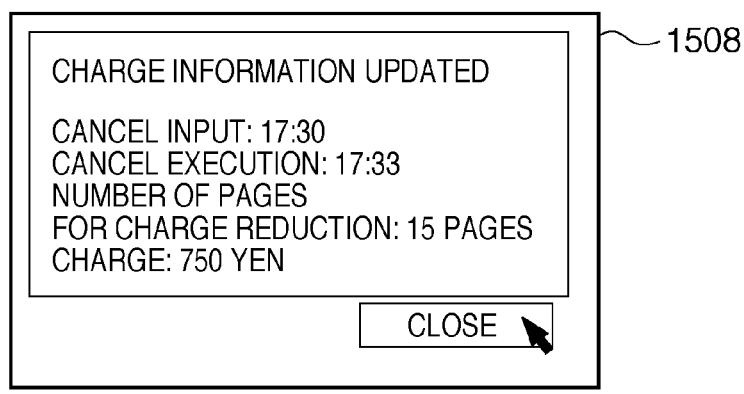

The UI screens shown in FIGS. 15A to 15D are generated by the UI processor 102 on the cloud print service 101 and are displayed on the user terminal 108. On a UI screen 1501, since no print or cancel end notification for "print 3" is sent from the printing apparatus 110 to the cloud print service 101 after completion of printing, an upload button 1502 (FIG. 15A) is displayed. When the user presses the upload button 1502, a UI screen 1503 is displayed (FIG. 15B). The user enters a file name of the charge adjustment information file acquired from the printing apparatus 110 in an input field 1504, and then presses an execution button 1505. When the charge adjustment information file is sent to the cloud print service 101 and charge information is updated, a UI screen 1506 is displayed, and a status of "print 3" is changed like a status 1507 (FIG. 15C). When the charge information is changed based on the charge adjustment information sent from the user, a UI screen which shows changed information like a display screen 1508 is displayed (FIG. 15D).

With the aforementioned arrangements and sequences, according to the invention of this embodiment, when the printing apparatus pull-prints print data stored in the print server, even when the firewall exists between the print server and printing apparatus, not only the print server but also the printing apparatus can execute timely cancel processing in accordance with an instruction. For this reason, any unnecessary print process or unnecessary charge can be prevented from being generated. Furthermore, even when some pages are printed due to delayed cancel processing after a cancel instruction, a charge for these pages can be reduced or exempted.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-095472, filed Apr. 16, 2010, which is hereby incorporated by reference herein in its entirety.

What is claimed is:

1. A print server adapted to implement a pull-printing technique with a printing apparatus, when said print server is connected to said printing apparatus over a network via a firewall which is adapted to restrict spontaneous accesses from said print server to said printing apparatus, comprising:
   a data generation unit configured to, when a print request is received from a user terminal via the network, generate print data in accordance with the print request, and store the print data in a storage;
   a determination unit configured to determine whether or not transmission processing for transmitting print data to the printing apparatus has finished, the print data being generated by the data generation unit in accordance with a read request of print data received from said printing apparatus via the network; and
   a cancel control unit configured to (a) store a generated cancel command in the storage as data separate from the print data if it is determined that the transmission processing has finished, and
   (b) store print data in the storage if it is determined that the transmission processing has not finished, wherein if the transmission processing has not finished, a next command in the print data to be transmitted to the printing apparatus is replaced with a cancel command.

2. The print server according to claim 1, further comprising:
   a charge calculation unit configured to make a charge calculation for said user terminal according to a sent print data amount; and
   a unit configured to receive a print data amount printed after a time recorded together with a cancel command from said printing apparatus,
   wherein a reception time of a cancel instruction together with the cancel command are stored in the storage, and
   said charge calculation unit is configured to make the charge calculation for a print data amount obtained by subtracting the print data amount printed after the reception time of the cancel instruction from the print data amount sent to said printing apparatus in response to the read request.

3. A network printing system which connects a print server according to claim 1 and a printing apparatus,
   wherein said printing apparatus is adapted to implement a pull-printing technique with a print server, when said printing apparatus is connected to said print server over a network via a firewall which is adapted to restrict spontaneous accesses from said print server to said printing apparatus, said apparatus comprising:
   a print data acquisition unit, configured to send a read request of print data to said print server via the network, and receive print data sent in response to the read request from said print server via the network, wherein the print data is based on a print request from a user terminal;
   a determination unit, configured to determine if the print data acquired by said print data acquisition unit includes a cancel command that instructs to cancel a print processing for the acquired print data, wherein the cancel command is based on a cancel instruction for the print request from the user terminal; and
   a processing unit, configured to, when said determination unit determines that the cancel command is not included, execute the print processing for the acquired print data, and for, when said determination unit determines that the cancel command is included, cancel the print processing for the acquired print data as a cancel command target, and notify said print server that the print processing is canceled.

4. The system according to claim 3, wherein said print server further comprises:
   a charge calculation unit configured to make a charge calculation for said user terminal according to a sent print data amount; and
   a unit configured to receive a print data amount printed after a time recorded together with a cancel command from said printing apparatus,
   wherein a reception time of a cancel instruction together with the cancel command are stored in the storage, and
   said charge calculation unit is configured to make the charge calculation for a print data amount obtained by subtracting the print data amount printed after the reception time of the cancel instruction from the print data amount sent to said printing apparatus in response to the read request.

5. A printing apparatus adapted to implement a pull-printing technique with a print server, when the printing apparatus is connected to the print server over a network via a firewall which is adapted to restrict spontaneous accesses from the print server to the printing apparatus, comprising:
   a print data acquisition unit, configured to send a read request of print data to the print server via the network, and receive print data sent in response to the read request from the print server via the network, wherein the print data is based on a print request from a user terminal;
   a determination unit, configured to determine if the print data acquired by the print data acquisition unit includes a cancel command that instructs to cancel a print processing for the acquired print data, wherein the print server determines whether or not transmission processing for transmitting print data to the printing apparatus has finished, the print data being generated by the print server in accordance with the read request of print data sent to the print server via the network, and wherein the print server (a) stores a generated cancel command as data separate from the print data if it is determined that the transmission processing has finished, and (b) stores print data if it is determined that the transmission processing has not finished, wherein if the transmission processing has not finished, a next command in the print data to be transmitted to the printing apparatus is replaced with a cancel command; and a processing unit, configured to, when said determination unit determines that the cancel command is not included, execute the print processing for the acquired print data, and to, when said determination unit determines that the cancel command is included, cancel the print processing for the acquired print data as a cancel command target, and notify the print server that the print processing is canceled.

6. The printing apparatus according to claim 5, further comprising:

a unit, configured to send an inquiry about the presence/absence of a cancel instruction for print data, which is being processed, to the print server, wherein when a response indicating the presence of a cancel instruction is received in response to the inquiry, said processing unit is configured to cancel the print processing for the acquired print data, and to notify the print server that the print processing is canceled.

7. The printing apparatus according to claim 6, further comprising:

a unit, configured to determine if there is a possibility of a failure in a communication with the print server, wherein when said unit determines that there is the possibility of a failure, said processing unit is configured to suspend the print processing for the acquired print data.

8. The printing apparatus according to claim 7, wherein said unit for determining the possibility is further configured to determine whether the failure that may have occurred in the communication requires a slow-down process or a pause process, to suspend the print processing for the acquired print data for a predetermined time period if the failure requires the slow-down process, and suspends the print processing for the acquired data until data is received from the print server if the failure requires the pause process.

9. The printing apparatus according to claim 8, wherein when print processing is canceled in response to a cancel command, said processing unit is further configured to notify the print server of a data amount of print data printed after a time recorded in the print data together with the cancel command.

10. A non-transitory computer readable medium storing program for controlling a computer connected to a network to function as a print server adapted to implement a pull-printing technique with a printing apparatus, when said print server is connected to said printing apparatus over a network via a firewall which is adapted to restrict spontaneous accesses from said print server to said printing apparatus, comprising:

data generation means for, when a print request is received from a user terminal via the network, generating print data according to the print request, and storing the print data in a storage means;

determination means for determining whether or not transmission processing for transmitting print data to the printing apparatus has finished, the print data being generated by the data generation means in accordance with a read request of print data received from said printing apparatus via the network; and cancel control means for (a) storing a generated cancel command in the storage as data separate from the print data if it is determined that the transmission processing has finished, and (b) storing print data in the storage if it is determined that the transmission processing has not finished, wherein if the transmission processing has not finished, a next command in the print data to be transmitted to the printing apparatus is replaced with a cancel command.

11. A printing method executed by a network printing system in which a print server and a printing apparatus are connected via a network, wherein said print server is adapted to implement a pull-printing technique with a printing apparatus, when said print server is connected to said printing apparatus over a network via a firewall which is adapted to restrict spontaneous accesses from said print server to said printing apparatus, the method comprising:

controlling, when the print server receives a print request from a user terminal via the network, the print server to generate print data according to the print request and to store the print data in storage;

controlling the print server to determine whether or not transmission processing for transmitting print data to the printing apparatus has finished, the print data being generated in accordance with a read request of print data received from said printing apparatus via the network;

controlling the printing apparatus to send a read request of print data to the print server via the network;

controlling the print server to determine whether or not transmission processing for transmitting print data to the printing apparatus has finished, the print data being generated in accordance with the read request of print data received from the printing apparatus via the network;

controlling the printing apparatus to receive the print data sent in response to the read request from said print server via the network, wherein the print data is based on a print request from a user terminal;

controlling the print server to (a) store a generated cancel command in the storage as data separate from the print data if it is determined that the transmission processing has finished, and (b) store print data in the storage if it is determined that the transmission processing has not finished, wherein if the transmission processing has not finished, a next command in the print data to be transmitted to the printing apparatus is replaced with a cancel command;

controlling the printing apparatus to determine if the print data acquired in the print data acquisition step includes a cancel command that instructs to cancel a print processing for the print data; and controlling, when it is determined that the cancel command is not included, the printing apparatus to execute the print processing for the acquired print data, and controlling, when it is determined that the cancel command is included, the printing apparatus to cancel the print processing for the acquired print data as a cancel command target, and to notify the print server that the print processing is canceled.

* * * * *